United States Patent
Ali et al.

(10) Patent No.: US 10,983,636 B2
(45) Date of Patent: Apr. 20, 2021

(54) WATER IMMUNE PROJECTED-CAPACITIVE (PCAP) TOUCHSCREEN

(71) Applicant: Elo Touch Solutions, Inc., Milpitas, CA (US)

(72) Inventors: Gazi Ali, Sunnyvale, CA (US); Yansun Xu, Mountain View, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 16/528,079

(22) Filed: Jul. 31, 2019

(65) Prior Publication Data

US 2020/0042154 A1    Feb. 6, 2020

Related U.S. Application Data

(60) Provisional application No. 62/713,878, filed on Aug. 2, 2018.

(51) Int. Cl.
  *G06F 3/041*   (2006.01)
  *G06F 3/044*   (2006.01)

(52) U.S. Cl.
  CPC ........ *G06F 3/04186* (2019.05); *G06F 3/0446* (2019.05); *G06F 3/0448* (2019.05)

(58) Field of Classification Search
  CPC ................................ G06F 3/041; G06F 3/044
  See application file for complete search history.

(56) References Cited

U.S. PATENT DOCUMENTS 9,740,352 B2    8/2017  Ahsan et al.
10,503,312 B2  12/2019  Xu
(Continued)

FOREIGN PATENT DOCUMENTS

EP    3132330 A1   2/2017
TW    I630523 B    7/2018

OTHER PUBLICATIONS

International Search Report and Written Opinion of the International Searching Authority directed to related International Patent Application No. PCT/US2019/044448, dated Nov. 13, 2019; 140 pages.

(Continued)

*Primary Examiner* — Chanh D Nguyen
*Assistant Examiner* — Nguyen H Truong
(74) *Attorney, Agent, or Firm* — Sterne, Kessler, Goldstein & Fox P.L.L.C.

(57) ABSTRACT

Embodiments improve projected-capacitive (PCAP) touchscreen performance for applications subject to water contamination. Embodiments include: increased separation between indium-tin-oxide (ITO)/silver connection of an electrode terminus and routing traces, and increased separation between electrostatic discharge (ESD) lines and sensor guard lines. Embodiments may include methods for rejecting false touches from self-capacitance readout mode measurements due to long water drops/rivulets on a touchscreen including peak ratios and locations of peaks on perimeter electrodes. Some embodiments include an optically clear adhesive layer between a first transparent substrate including a first ITO coating forming a first set of electrodes, and a second transparent substrate including a second ITO coating forming a second set of electrodes. The first transparent substrate may include non-solid trace shields that overlay on routing traces of the second transparent substrate; and the second transparent substrate may include non-solid trace shields that overlay on routing traces of the first transparent substrate.

20 Claims, 17 Drawing Sheets

(56) References Cited

U.S. PATENT DOCUMENTS

| | | |
|---|---|---|
| 2013/0038554 A1 | 2/2013 | West |
| 2014/0085260 A1 | 3/2014 | Guarneri et al. |
| 2015/0077394 A1 | 3/2015 | Dai et al. |
| 2016/0004380 A1 | 1/2016 | Kim et al. |
| 2016/0216796 A1* | 7/2016 | Johansson ......... G06F 3/041662 |
| 2017/0090616 A1 | 3/2017 | Ashan et al. |
| 2018/0018051 A1* | 1/2018 | Ogura ..................... H05K 1/02 |
| 2018/0024665 A1 | 1/2018 | Kent et al. |
| 2018/0321779 A1* | 11/2018 | Huang ................. G06F 3/0446 |
| 2018/0335870 A1 | 11/2018 | Ali et al. |
| 2018/0335889 A1* | 11/2018 | Tucker ................. G06F 3/0418 |
| 2019/0018521 A1* | 1/2019 | Aoshima ............. H05K 1/0225 |
| 2019/0220131 A1 | 7/2019 | Xu |
| 2019/0227669 A1* | 7/2019 | Maharyta ................ G06F 3/044 |

OTHER PUBLICATIONS

Wang et al., "Detecting and Leveraging Finger Orientation for Interaction with Direct-Touch Surfaces," Proceedings of the $22^{nd}$ Annual ACM Symposium on User Interface Software and Technology: Victoria, British Columbia, Oct. 4-7, 2009, ACM, New York, NY. Oct. 4, 2009; 10 pages.

* cited by examiner

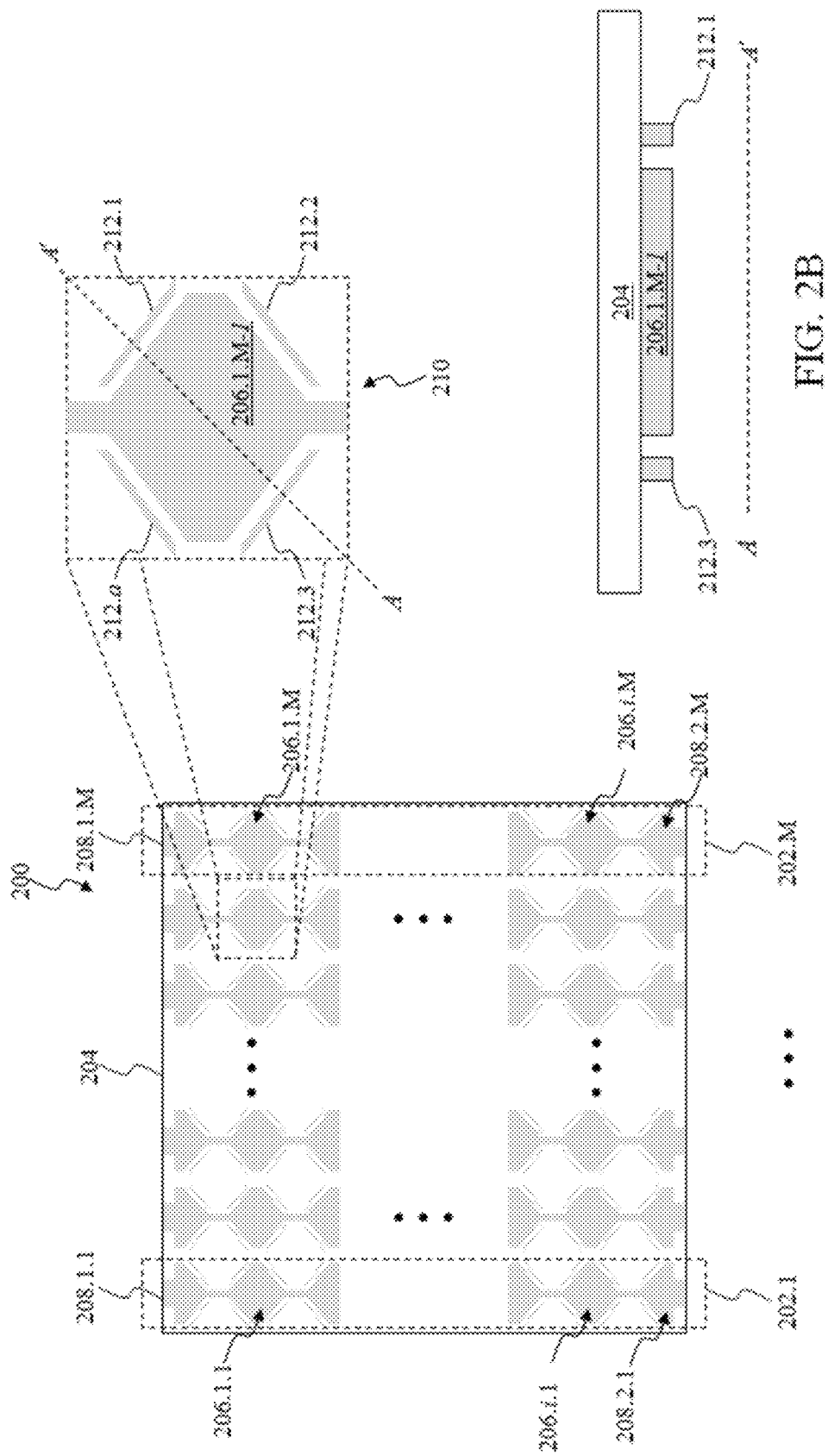

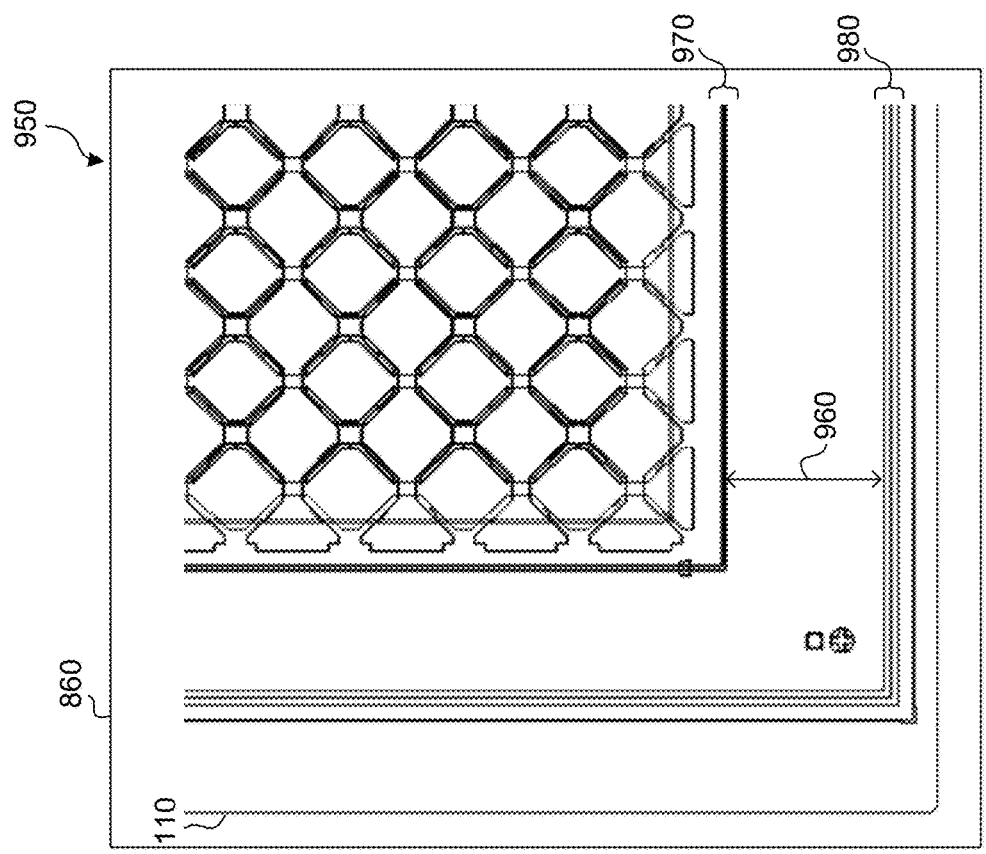
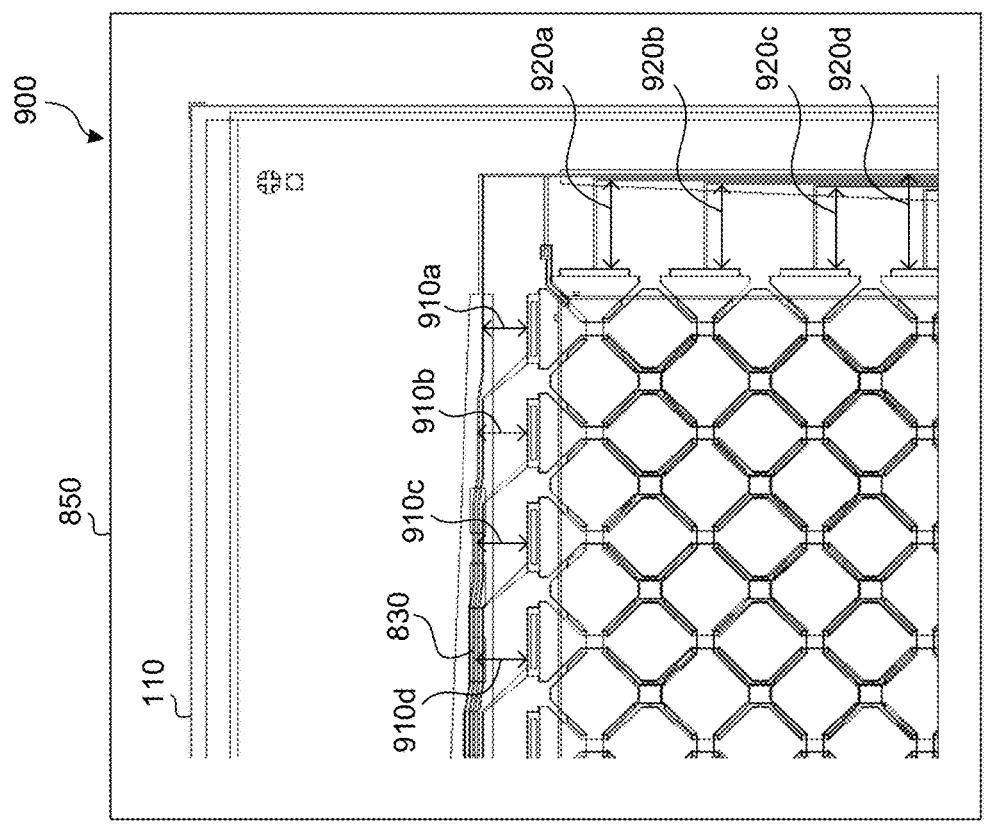
FIG. 9A
FIG. 9B

US 10,983,636 B2

WATER IMMUNE PROJECTED-CAPACITIVE (PCAP) TOUCHSCREEN

CROSS-REFERENCE TO RELATED APPLICATIONS

This application claims benefit of U.S. Provisional Application No. 62/713,878, filed on Aug. 2, 2018, entitled, Water Immune Projected-Capacitive (PCAP) Touchscreen, which is incorporated herein by reference in its entirety.

BACKGROUND

Field

The present disclosure relates generally to touch sensitive systems, and more specifically to display systems in the presence of water contaminants.

Background Art

The ability to interact with computer applications via touch with displays is ubiquitous for today's consumers. While several touch technologies are possible to support touch interactions, each has advantages and disadvantages that tailor each for particular environments, sizes, and applications. Projected capacitive (PCAP) technology is utilized to support characteristics expected from touch interactions in screen devices.

PCAP electronics may read out a PCAP touchscreen in either of two distinct modes. One readout mode is referred to as "mutual-capacitive" readout mode, "mutual-capacitance" readout, or more simply "mutual-mode". The other mode is referred to as "self-capacitive" readout mode, "self-capacitance" readout, or more simply "self-mode".

The mutual-mode is known to provide outstanding multi-touch performance. Mobile devices such as smartphones and tablets typically use PCAP touchscreens operated in mutual-mode. Such mobile-device touch systems can typically track simultaneously ten or more touches with little difficulty. However, for PCAP touchscreens with electronic readout in mutual-mode, touch performance degrades rapidly with increasing presence of water contaminants on the touch surface. The self-mode does not support multi-touch performance at the same level as mutual mode. On the other hand, compared to mutual-mode, self-mode is much less affected by water contaminants on the touch surface. Self-mode is preferred for applications subject to water contamination. This is particularly true for applications that do not require simultaneous detection of multiple touches, such as applications only involving menu selection via single-touch activation of touch buttons.

Even utilizing mutual mode and self-mode measurements, PCAP touchscreens may still experience poor performance in the presence of significant water contaminants.

SUMMARY

Embodiments of this disclosure improve projected-capacitive (PCAP) touchscreen performance for applications subject to water contamination. Embodiments include: an increased separation between indium-tin-oxide (ITO)/silver connection of an electrode terminus and routing traces, and an increased separation between electrostatic discharge (ESD) lines and sensor guard lines, especially at a bottom edge of the PCAP touchscreen. The separations may reduce unwanted capacitive coupling with water contaminants or running water on touch screen. Embodiments may include methods for rejecting false touches due to the effects of long vertical water drops/rivulets on self-capacitance measurements; these methods include algorithms for qualifying signal peak ratios and locations of peaks on perimeter electrodes of the touch screen. Some embodiments include an optically clear adhesive (OCA) layer between a first transparent substrate including a first ITO coating forming a first set of electrodes, and a second transparent substrate including a second ITO coating forming a second set of electrodes. The first transparent substrate may include non-solid trace shields that overlay on routing traces of the second transparent substrate.

System, method, and computer program product embodiments are provided for a PCAP touch system for accessing mutual-capacitance and self-capacitance touch data obtained from a plurality of touchscreen electrodes of the touchscreen, and detecting false touches based on the self-capacitance touch data where the self-capacitance touch data includes signal amplitude data in separate coordinate measurements. Detecting the false touches includes accessing one or more candidate touches from initial processing of self-capacitance touch data, and for a first candidate touch of the one or more candidate touches, computing a first $R_{XY}$ peak ratio, wherein the first $R_{XY}$ peak ratio comprises [(X peak amplitude)/(Y peak amplitude)] of the first candidate touch. The method also includes determining that the first candidate touch is not a false touch if the first $R_{XY}$ peak ratio is greater than or equal to $R_{MIN}$ and less than or equal to $R_{MAX}$, and then analyzing the mutual-capacitance touch data against the first candidate touch to further determine whether the first candidate touch is a valid touch.

Some embodiments include for each of the one or more candidate touches, determining an X-peak location and a Y-peak location, and determining that an X-peak location and a Y-peak location of the first candidate touch are both located on interior electrodes, wherein the first candidate touch is included in the analysis to determine valid touches. Some embodiments also include for a second candidate touch of the one or more candidate touches, computing a second $R_{XY}$ peak ratio, wherein the second $R_{XY}$ peak ratio comprises [(X peak amplitude)/(Y peak amplitude)] of the second candidate touch. Embodiments also include determining that the second $R_{XY}$ peak ratio computed is greater than or equal to $R_{MIN}$ and less than or equal to $R_{MAX}$, and determining that the second candidate touch is located on an edge electrode wherein the second candidate touch is not included in the analysis to determine valid touches if the first candidate touch is included in the analysis to determine valid touches.

In some embodiments, a distance from a first touchscreen electrode of the plurality of touchscreen electrodes to routing traces is greater than 3.0 mm. Some embodiments include a distance from a sensor guard line to an electrostatic discharge (ESD) line of the touchscreen is greater than one sensor electrode pitch size. In some embodiments, the distance from the sensor guard line to the ESD line of the touchscreen is at least 5.0 mm. In some embodiments a PCAP touchscreen includes an upper film layer, a lower film layer, and a middle adhesive layer, wherein the upper film layer comprises a first non-solid trace shield that overlays a first routing trace on the lower film layer and the lower film layer comprises a second non-solid trace shield that overlays a second routing trace on the upper film layer. The first non-solid trace shield comprises a pattern that overlays 50% of the first routing trace on the lower film layer, and the second non-solid trace shield comprises a pattern that overlays 50% of the second routing trace on the upper film layer.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIG. 2A and FIG. 2B illustrate an exemplary first electrode pattern that can be used to implement the touchscreen according to an exemplary embodiment of the present disclosure;

FIGS. 9A and 9B illustrate portions of an exemplary touchscreen according to an exemplary embodiment of the present disclosure;

Figure 10A:
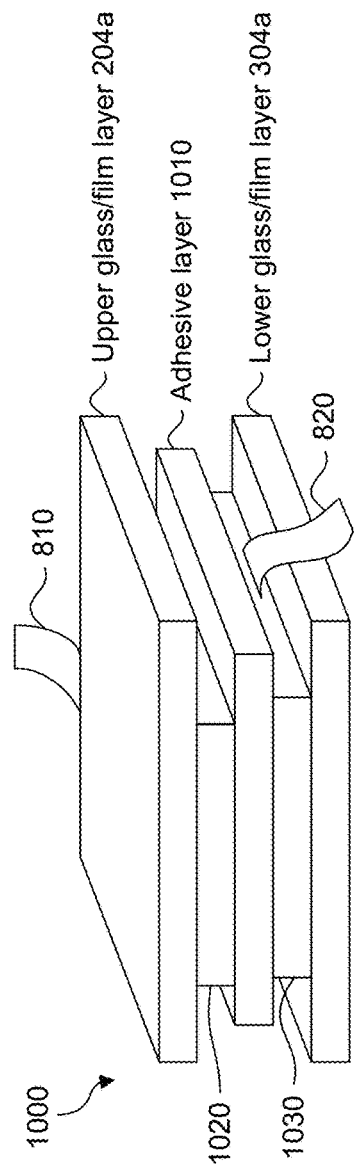
Figure 10C:
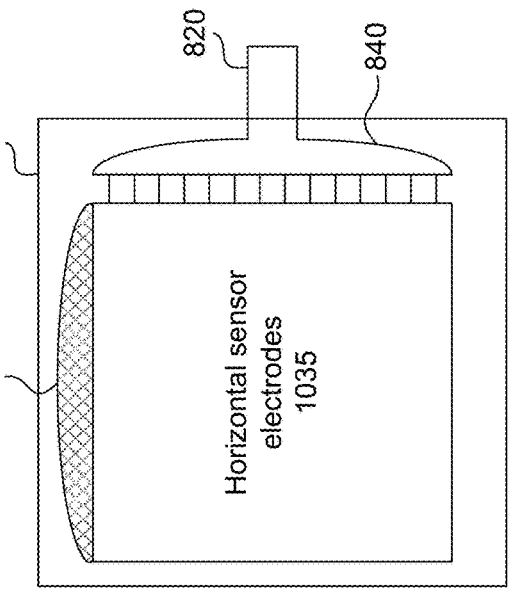
Figure 10B:
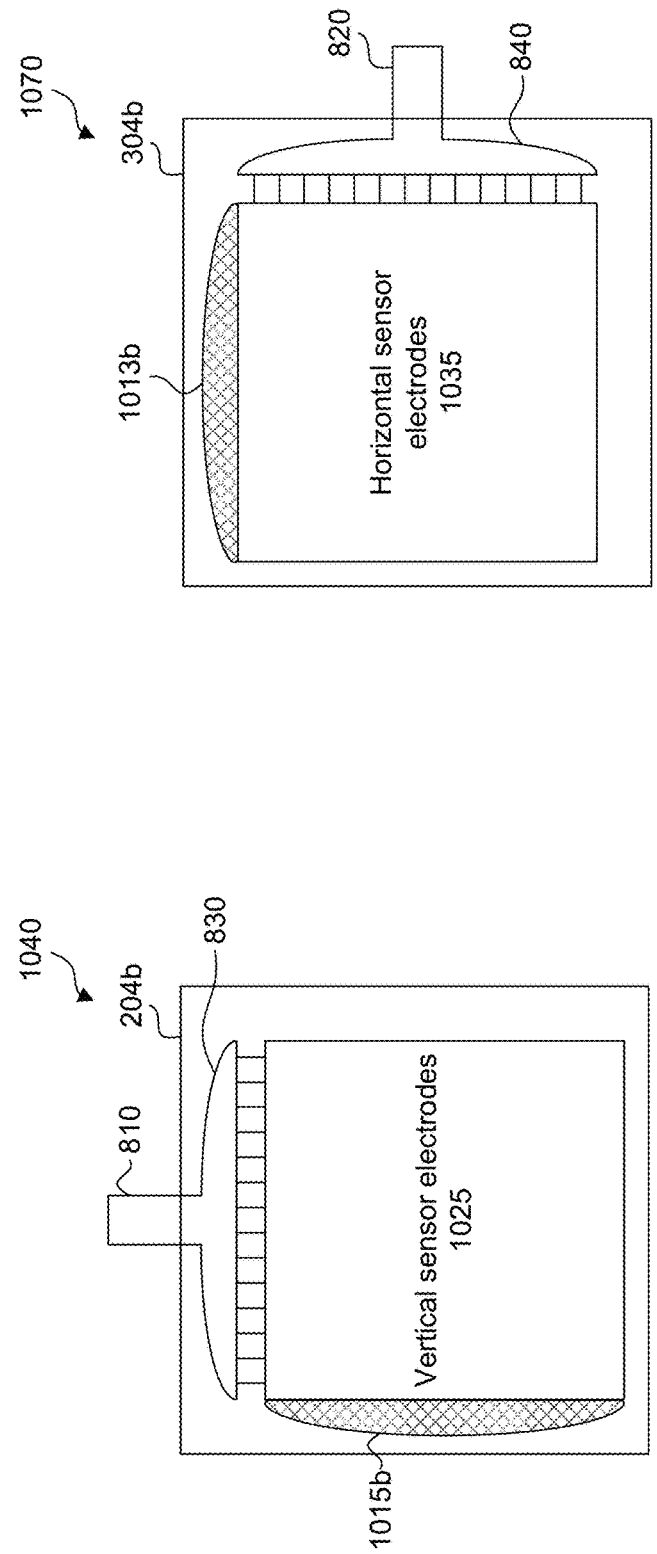
Figure 11A:
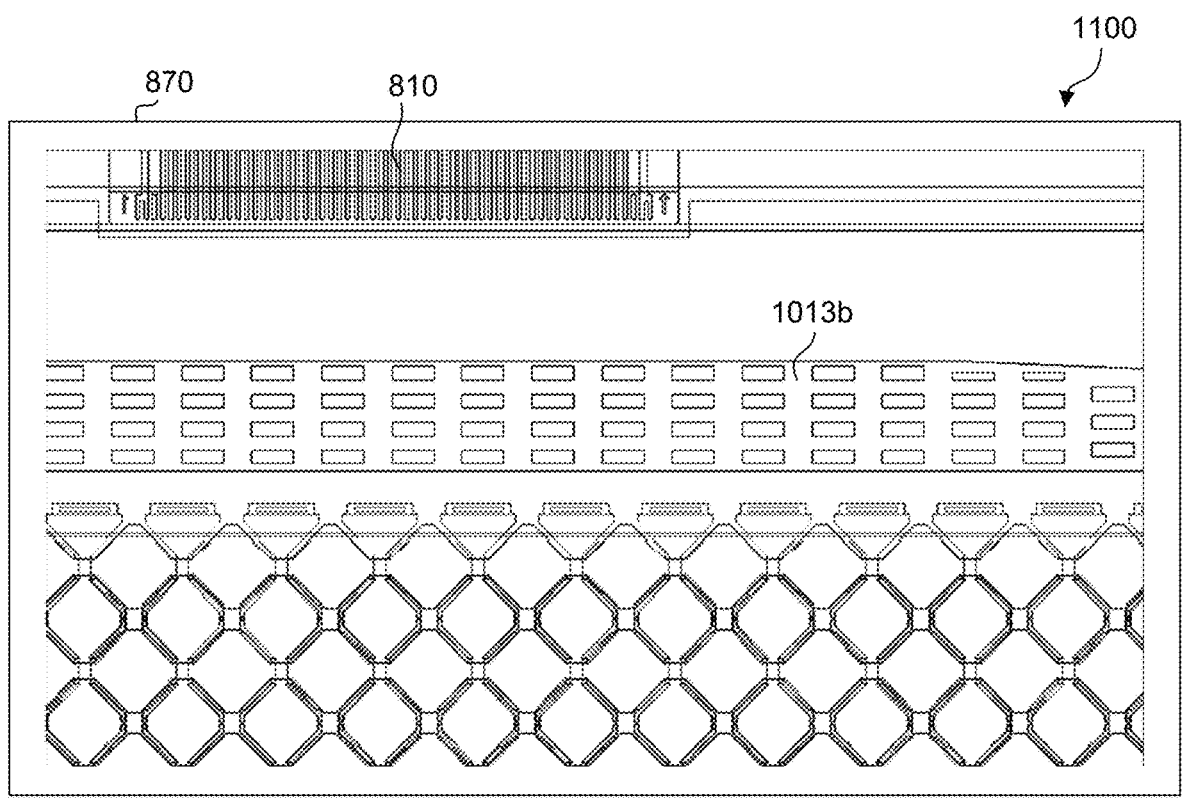
Figure 11B:
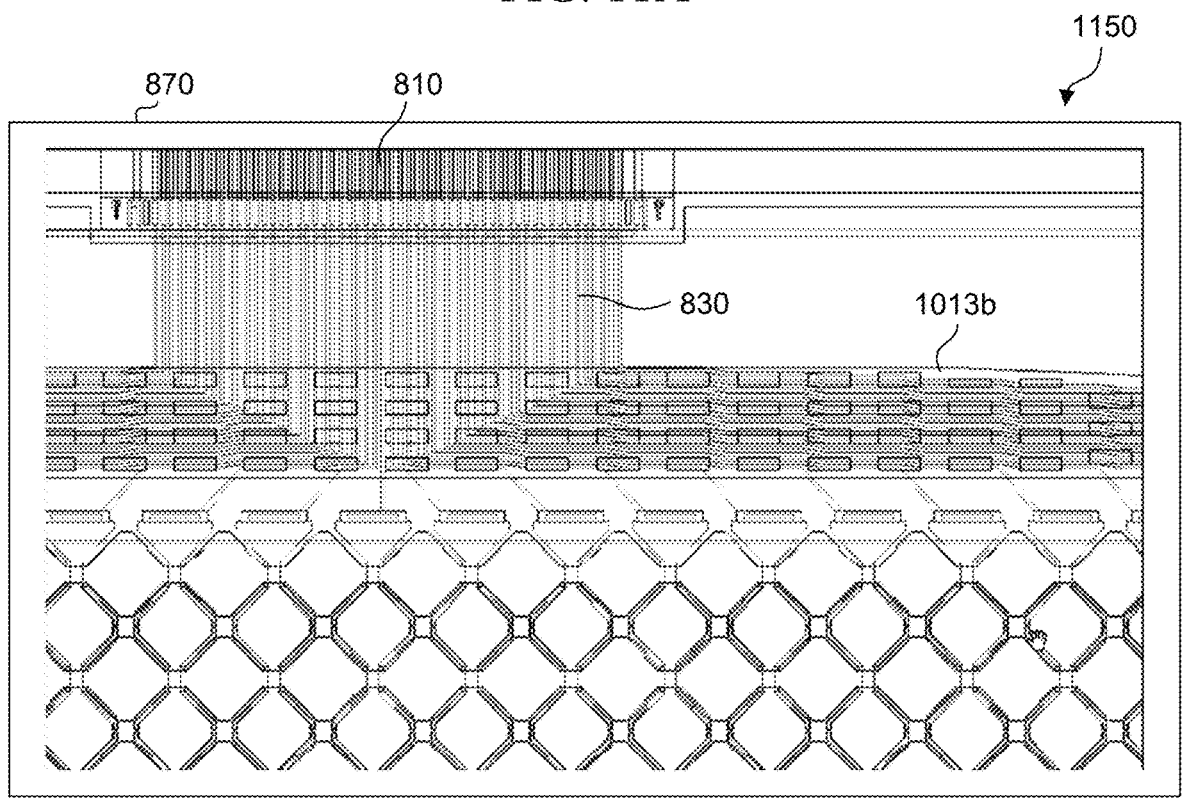
Figure 12B:
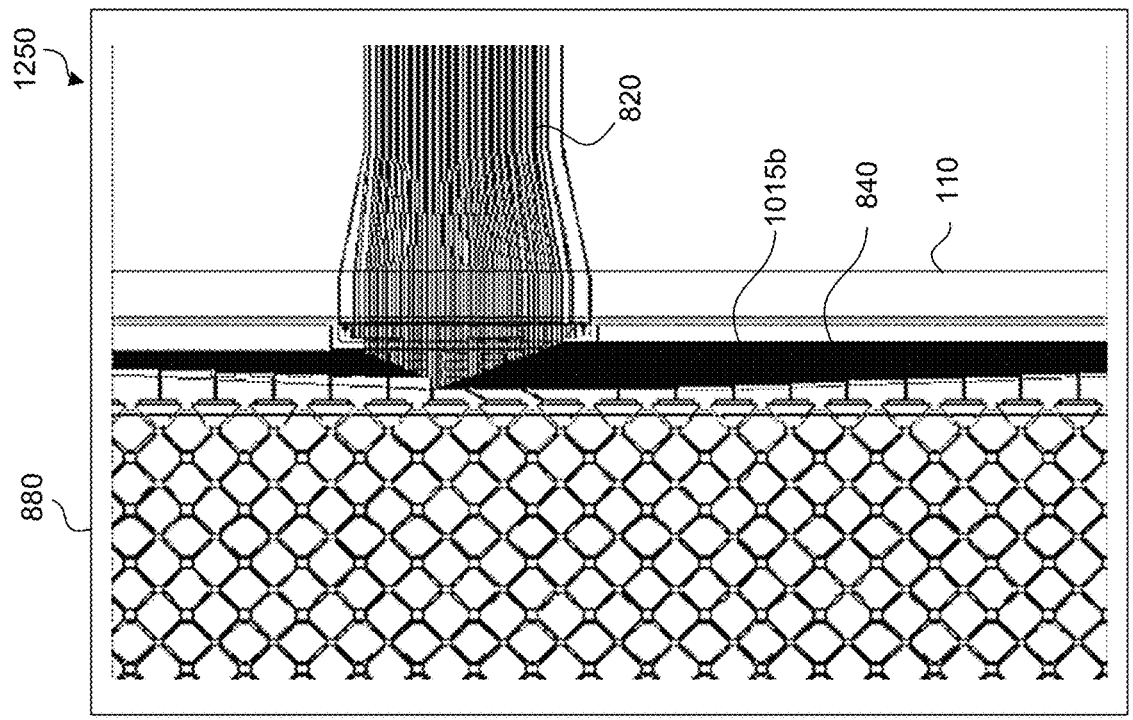
Figure 12A:
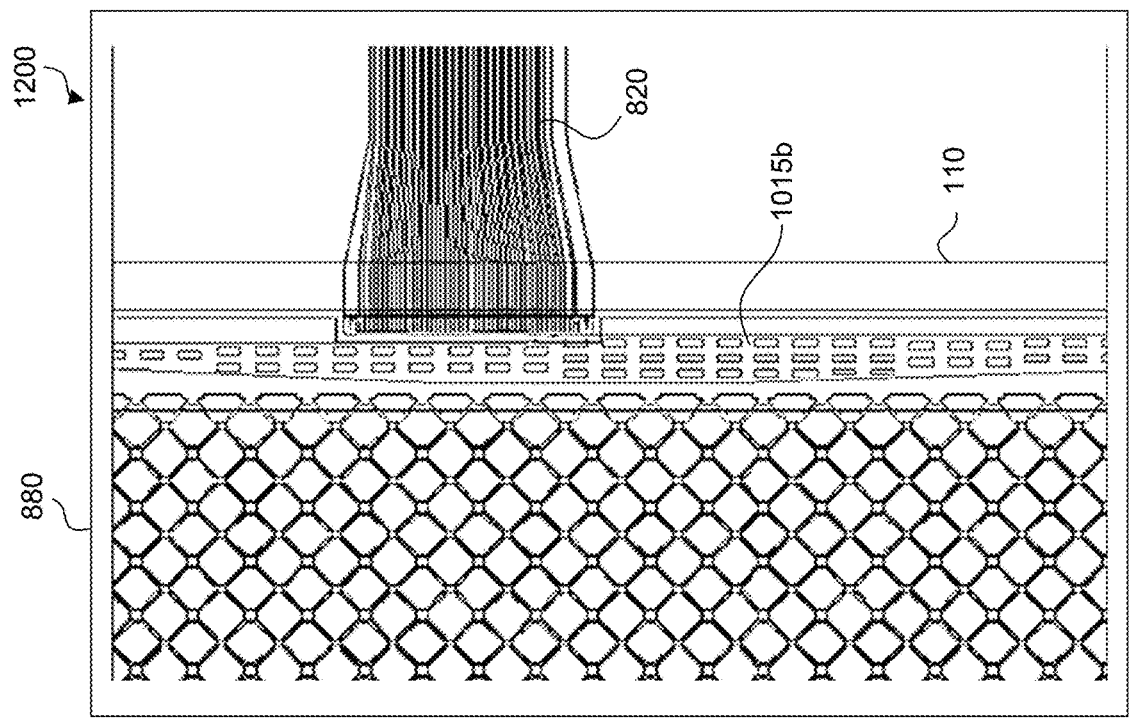
Figure 13:
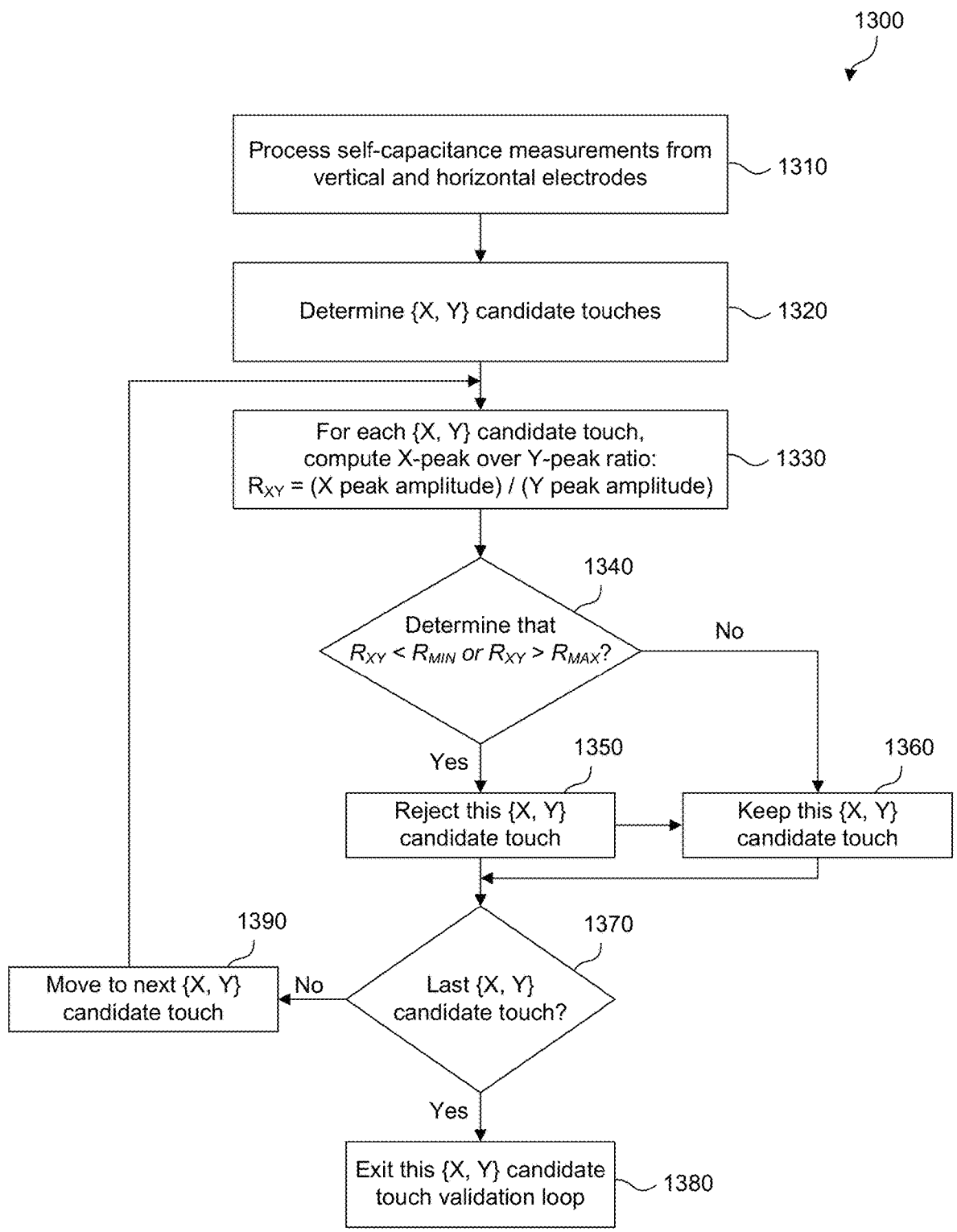
Figure 14:
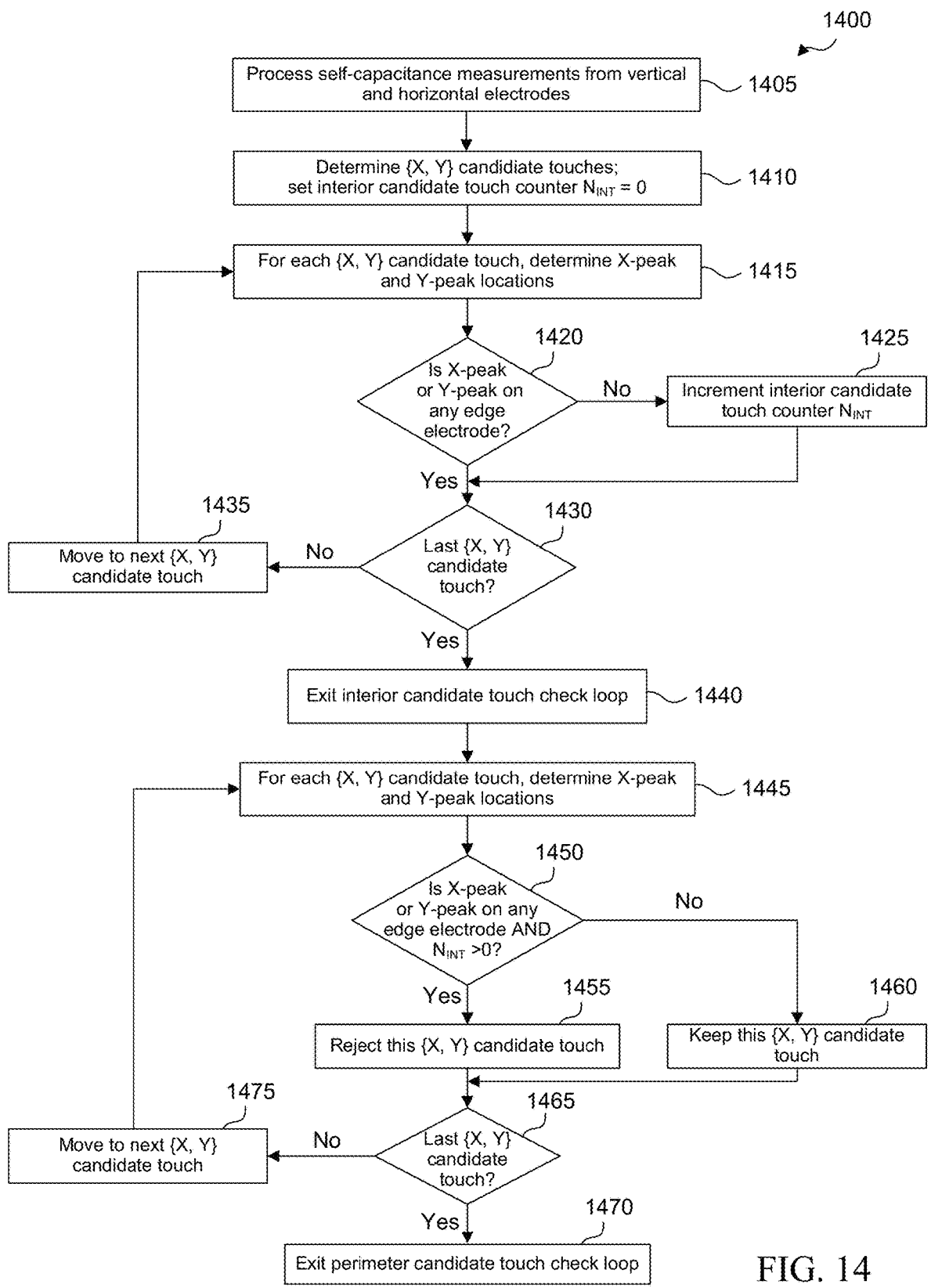
Figure 15:
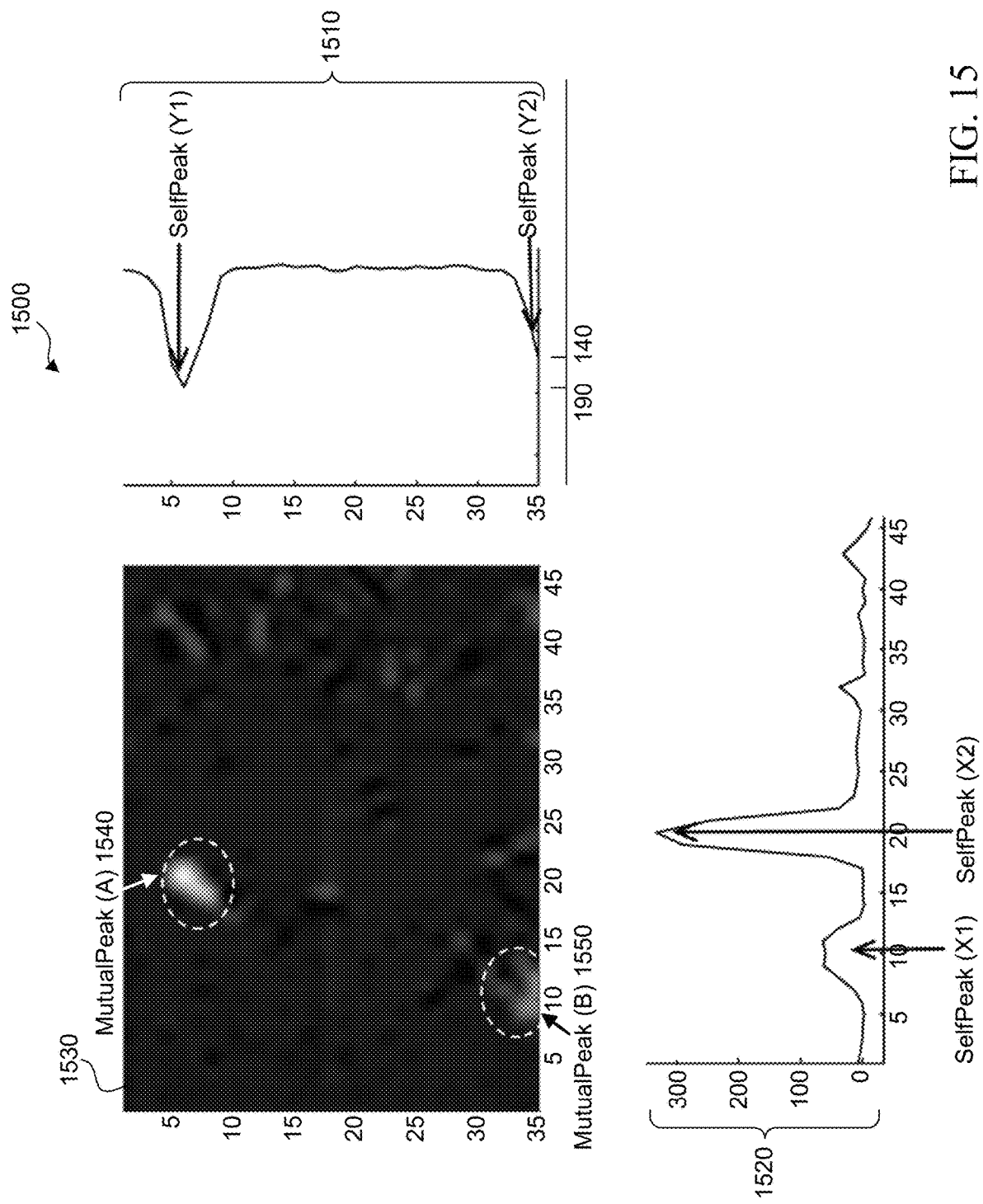
Figure 16:
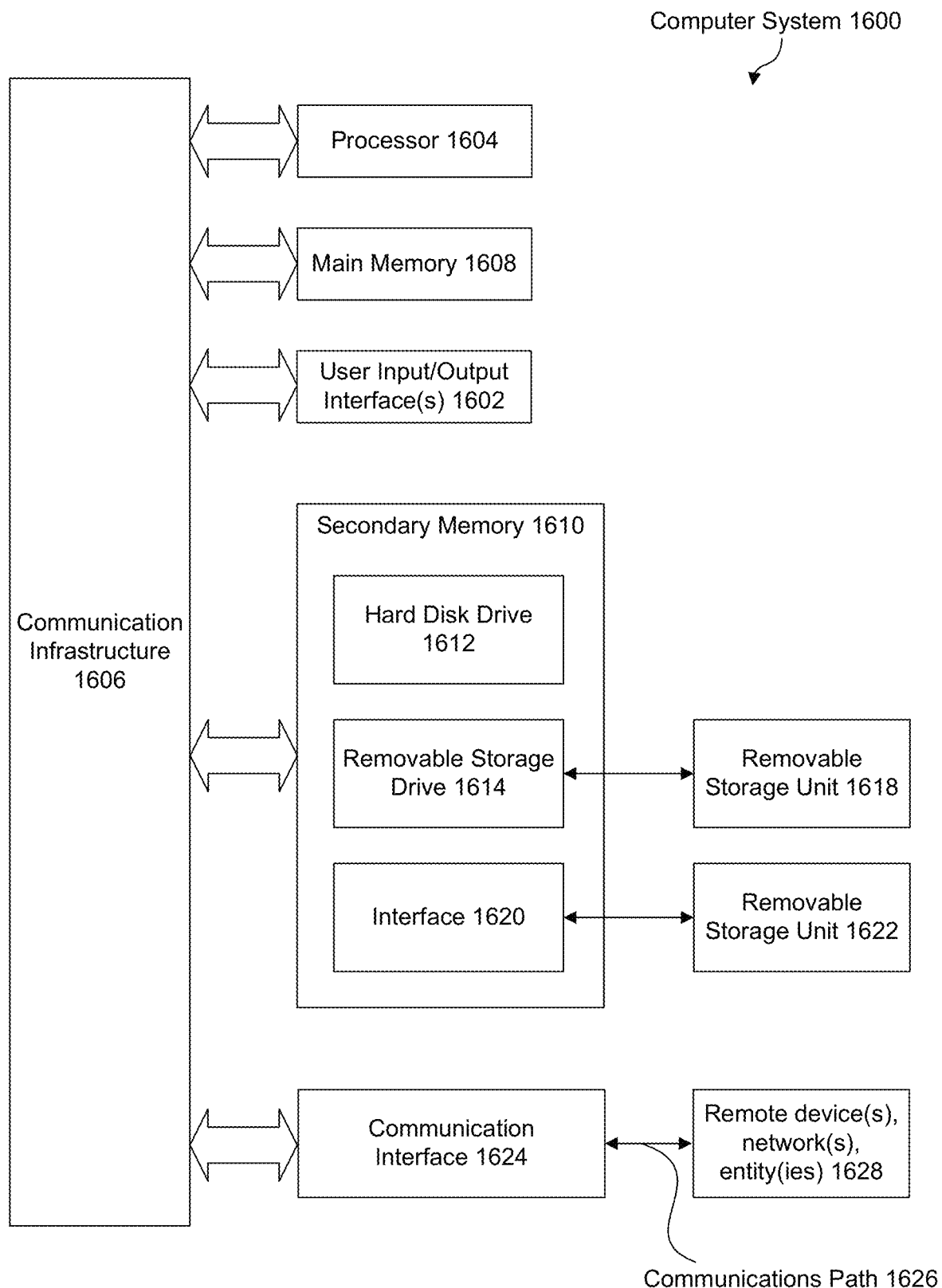

FIGS. 10A, 10B, and 10C illustrate layers of an exemplary touchscreen, according to example embodiments of the disclosure;

FIGS. 11A and 11B illustrate portions of an exemplary trace shield, according to example embodiments of the disclosure;

FIGS. 12A and 12B illustrate portions of an exemplary trace shield, according to example embodiments of the disclosure;

FIG. 13 illustrates a method for rejecting false touches, according to example embodiments of the disclosure;

FIG. 14 illustrates another method for rejecting false touches, according to example embodiments of the disclosure;

FIG. 15 illustrates an example diagram of fluid measurements on a touchscreen based on a mixed mode measurement frame, according to example embodiments of the disclosure; and FIG. 16 illustrates an example computer system useful for implementing various embodiments.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

U.S. patent application Ser. No. 15/214,196, entitled Projected-Capacitive (PCAP) Touchscreen filed on Jul. 19, 2016, and U.S. patent application Ser. No. 14/871,496, entitled Supporting Multiple Users on a Large Scale Projected Capacitive Touchscreen ('496 Application) filed on Sep. 30, 2015, are incorporated herein by reference in their entirety. Both of these applications describe example PCAP touchscreen systems.

U.S. Patent Application No. 62/508,549, entitled PCAP with Enhanced Immunity to Water Contaminants filed on May 19, 2017, ("Immunity Application") which is incorporated herein by reference in its entirety, includes descriptions of an example mixed-mode measurement frame that includes self-mode measurement and a mutual-mode measurement.

U.S. patent application Ser. No. 15/874,510, entitled Large PCAP Screen with Multiple Touch Controller ASICS with Interleaved Receiver Connections ('510 Application) filed on Jan. 18, 2018, is incorporated herein by reference in its entirety.

Figure 1:
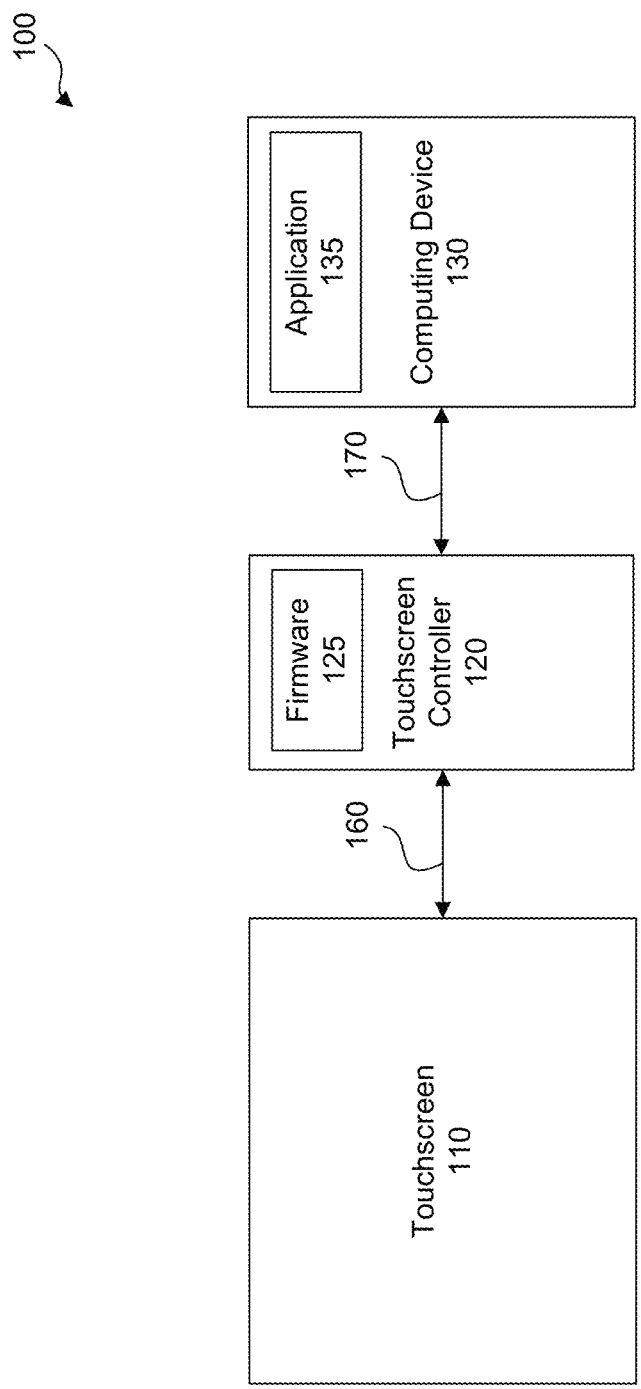
FIG. 1 illustrates a projected capacitive (PCAP) touch system, according to example embodiments of the disclosure.

FIG. 1 illustrates a projected capacitive (PCAP) touch system 100 according to example embodiments of the disclosure. System 100 includes touchscreen 110, touchscreen controller 120 that includes firmware 125, and computing device 130. Application 135 may be software that runs on computing device 130. In embodiments, touchscreen 110 may be a PCAP touchscreen used as an interactive surface. The interactive surface may be a gaming table, a home entertainment system, an industrial control system, a corporate boardroom communication and collaboration device, and/or large versions of the above examples, etc.

Touchscreen 110 may be communicatively coupled to touchscreen controller 120 via interface 160, and touchscreen controller 120 may be communicatively coupled to computing device 130 via interface 170. Interfaces 160 and 170 may be wired or wireless and comprise various technologies including but not limited to universal serial bus (USB), Bluetooth™ Low Energy (BLE), WiFi™, and/or logic traces on a circuit board that may be coupled to a connector.

Touchscreen controller 120 may be an application-specific integrated circuit (ASIC). Although one touchscreen controller 120 is shown, two or more are possible (see the '510 Application.) Computing device 130 may be a host computer running software application 135 (e.g., application-level software), such as a gaming application. Software application 135 may support multiple users that interact with software application 135. Touchscreen controller 120 includes corresponding firmware 125 that may communicate with software application 135 in computing device 130 via a communication protocol to support the performance characteristics of software application 135.

Touchscreen controller 120 includes one or more processors, driver/receiver circuitry, and memory. The one or more processors may include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access memory, an internal memory and/or external memory to retrieve instructions stored in the memory, which when executed by the processor, perform the corresponding function(s) associated with the processor.

Driver/receiver circuitry of touchscreen controller 120 may include analog-to-digital converters, flexibly programmable driver/receiver circuits, and/or filters for example. The one or more processors control the driver/receiver circuitry. Touchscreen controller 120 may include memory that stores instructions for the one or more processors as well as data such as received touch signal data. The memory may also be used to store baseline capacitance values measured when no touch is present; touches are recognized when live capacitance measurements differ from stored baseline values. The received touch signal data are based on electronic signals responsive to changes in capacitances associated with touchscreen 110. Memory may include but is not limited to: random access memory (RAM), electrically erasable programmable read-only memory (EEPROM), or flash memory.

FIG. 2A and FIG. 2B illustrate an exemplary first electrode pattern 200 that can be used to implement touchscreen 110 of FIG. 1, according to an exemplary embodiment of the present disclosure. For explanation purposes, FIG. 2A and FIG. 2B may be described with elements from previous figures. Electrode pattern 200 includes vertical electrodes 202.1 through 202.M, configured and arranged in series of M columns, and a plurality of adjacent floating transparent conductive islands disposed on a transparent substrate 204. The transparent substrate 204 represents one or more optically transparent materials. The one or more non-conductive, optically transparent materials can be flexible or inflexible. In an exemplary embodiment, the transparent substrate 204 is implemented using a plate of glass, in another exemplary embodiment transparent substrate 204 is implemented using a film.

The vertical electrodes 202.1 through 202.M are oriented in a vertical direction, such as parallel to the y-axis of the Cartesian coordinate system and perpendicular to the x-axis of the Cartesian coordinate system. In this configuration and arrangement, the vertical electrodes 202.1 through 202.M may be referred to as "X" electrodes due to their role in determining the x coordinates of the touch of the operator when present. However, those skilled in the relevant art(s) will recognize that the other configurations and arrangements for the vertical electrodes 202.1 through 202.M are possible without departing from the spirit and scope of the present disclosure.

As illustrated in FIG. 2A, the vertical electrodes 202.1 through 202.M include electrode pads 206.1.1 through 206.$i$.M and electrode terminuses 208.1.1 through 208.2.M. In an exemplary embodiment, the electrode terminuses 208.1.1 through 208.2.M represent interfaces between the electrode pads 206.1.1 through 206.$i$.M and associated electronics, such as by using one or more printed silver conductors on the transparent substrate 204 and/or one or more flex cables.

As additionally illustrated in FIG. 2A, the electrode pads 206.1.1 through 206.$i$.M are configured and arranged in a series of i rows and a series of M columns on the transparent substrate 204. Similarly, the electrode terminuses 208.1.1 through 208.2.M are configured and arranged in a series of two rows and a series of M columns on the transparent substrate 204. Suitable connections between the electrode pads 206.1.1 through 206.$i$.M to corresponding electrode terminuses 208.1.1 through 208.2.M form a corresponding vertical electrode from among the vertical electrodes 202.1 through 202.M. For example, the electrode pads 206.1.1 through 2061.1 within a first column are mechanically and electrically connected to the electrode terminuses 208.1.1 through 208.2.1 from among a first column to form the vertical electrode 202.1. However, those skilled in the relevant art(s) will recognize that other groupings of the electrode pads 206.1.1 through 206.$i$.M for one or more of the vertical electrodes 202.1 through 202.M are possible without departing from the spirit and scope of the present disclosure.

As shown in FIG. 2A, electrode pads 206.1.1 through 206.$i$.M can each have one or more floating transparent conductive islands adjacent to it. For example, each of electrode pads 206.1.1 through 206.$i$.M can have four floating transparent conductive islands 212.1 through 212.$a$ adjacent to it, as illustrated in further detail with respect to electrode pad 206.1.M−1 located in a portion 210 of electrode pattern 200. Although four floating transparent conductive islands 212.1 through 212.$a$ are illustrated in FIG. 2A, those skilled in the relevant art(s) will recognize that other numbers of transparent conductive islands are possible without departing from the spirit and scope of the present disclosure. In an exemplary embodiment, the electrode pads 206.1.1 through 206.$i$.M and the plurality of floating transparent conductive islands can be implemented using a suitable transparent conductor, e.g., indium-tin-oxide (ITO). Further, although the electrode pads 206.1.1 through 206.$i$.M are implemented in a shape of a diamond in FIG. 2A, it should be appreciated that this is illustrative and not restrictive of the shape that can be implemented by those skilled in the relevant art(s).

As the term 'floating' implies, the plurality of floating transparent conductive islands represent shapes of transparent conductive material, which are not electrically connected within the electrodes 202.1 through 202.M. In an embodiment, the plurality of floating transparent conductive islands eliminate, or substantially reduce, one or more optical discontinuities that would be otherwise present in touchscreen 110 that includes electrodes 202.1 through 202.M.

FIG. 2B illustrates a cross-section of the portion 210 of electrode pattern 200 along the line A-A', and includes a cross-section of the transparent substrate 204, a cross-section of the electrode pad 206.1.M−1, a cross-section of the floating transparent conductive island 212.1, and a cross-section of the floating transparent conductive island 212.3. In an exemplary embodiment, the transparent substrate 204 is implemented as a plate of glass with an approximate thickness between a fraction of a millimeter to several millimeters, while the electrode pad 206.1.M−1, the floating transparent conductive island 212.1, and/or the floating transparent conductive islands 212.3 is implemented using a coating of ITO with an approximate thickness less than a wavelength of light. The cross-section of the portion 210 of electrode pattern 200 is to be further described with reference to FIG. 4B and FIG. 4D.

Figures 3A, 3B:
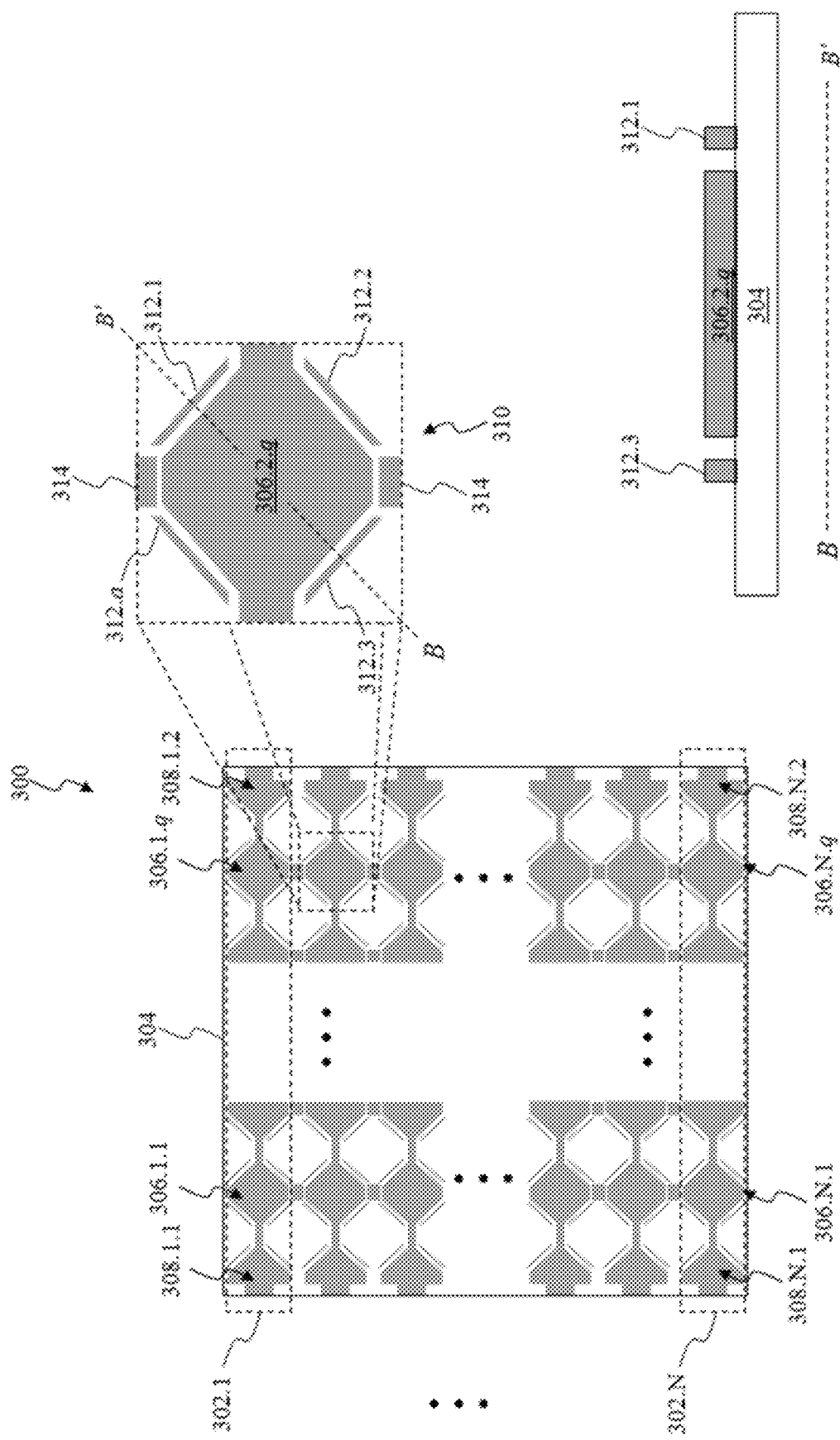
FIG. 3A and FIG. 3B illustrate an exemplary second electrode pattern that can be used to implement the touchscreen according to an exemplary embodiment of the present disclosure.

FIG. 3A and FIG. 3B illustrate an exemplary second electrode pattern 300 that can be used to implement touchscreen 110 according to an exemplary embodiment of the present disclosure. For explanation purposes, FIGS. 3A and 3B may be described with elements from previous figures. Second electrode pattern 300 includes horizontal electrodes 302.1 through 302.N, configured and arranged in a series of N rows, and a plurality of adjacent floating transparent conductive islands disposed on a transparent substrate 304. The transparent substrate 304 is substantially similar to the transparent substrate 204 and will not be discussed in further detail. However, those skilled in the relevant art(s) will recognize that the transparent substrate 304 can be implemented with a different material from the transparent substrate 204 without departing from the spirit and scope of the present disclosure.

In the exemplary embodiment illustrated in FIG. 3A, the horizontal electrodes 302.1 through 302.N are oriented in a horizontal direction, such as perpendicular to the y-axis of the Cartesian coordinate system and parallel to the x-axis of the Cartesian coordinate system. In this configuration and arrangement, the horizontal electrodes 302.1 through 302.N may be referred to as "Y" electrodes due to their role in determining the y coordinates of the touch of the operator when present. However, those skilled in the relevant art(s) will recognize that the other configurations and arrangements for the electrodes 302.1 through 302.N are possible without departing from the spirit and scope of the present disclosure.

As illustrated in FIG. 3A, the horizontal electrodes 302.1 through 302.N include electrode pads 306.1.1 through 306.N.q and electrode terminuses 308.1.1 through 308.N.2. In an exemplary embodiment, the electrode terminuses 308.1.1 through 308.N.2 represent interfaces between the electrode pads 306.1.1 through 306.N.q and associated electronics, such as by using one or more printed silver conductors on the transparent substrate 304 and/or one or more flex cables.

As additionally illustrated in FIG. 3A, the electrode pads 306.1.1 through 306.N.q are configured and arranged in a series of N rows and a series of q columns on the transparent substrate 304. Similarly, the electrode terminuses 308.1.1 through 308.N.2 are configured and arranged in a series of N rows and a series of two columns on the transparent substrate 304. Suitable connections between the electrode pads and corresponding electrode terminuses form a corresponding horizontal electrode. For example, the electrode pads 306.1.1 through 306.1.$q$ are mechanically and electrically connected to the electrode terminuses 308.1.1 through 308.1.2 to form the horizontal electrode 302.1. However, those skilled in the relevant art(s) will recognize that other groupings of the electrode pads 306.1.1 through 306.N.q for one or more of the horizontal electrodes 302.1 through 302.N are possible without departing from the spirit and scope of the present disclosure.

As shown in FIG. 3A, electrode pads 306.1.1 through 306.N.q, can each have one or more floating transparent conductive islands adjacent to it. For example, each of electrode pads 306.1.1 through 306.N.q can have floating transparent conductive islands 312.1 through 312.$a$ and floating transparent conductive islands 314 adjacent to it, as illustrated in further detail with respect to electrode pad 306.2.$q$ located in a portion 310 of electrode pattern 300. In an embodiment, the electrode pads 306.1.1 through 306.N.q and the plurality of floating transparent conductive islands of electrode pattern 300 are substantially similar to the electrode pads 206.1.1 through 206.$i$.M and the plurality of floating transparent conductive islands of electrode pattern 200, respectively; therefore, only differences are discussed in further detail herein.

FIG. 3B illustrates a cross-section of the portion 310 of electrode pattern 300 along the line B-B', which includes a cross-section of the transparent substrate 304, a cross-section of the electrode pad 306.2.$q$, a cross-section of the floating transparent conductive island 312.1, and a cross-section of the floating transparent conductive island 312.3. The cross-section of the portion 310 of electrode pattern 300 is to be further described with reference to FIG. 4B and FIG. 4D.

Figure 4A:
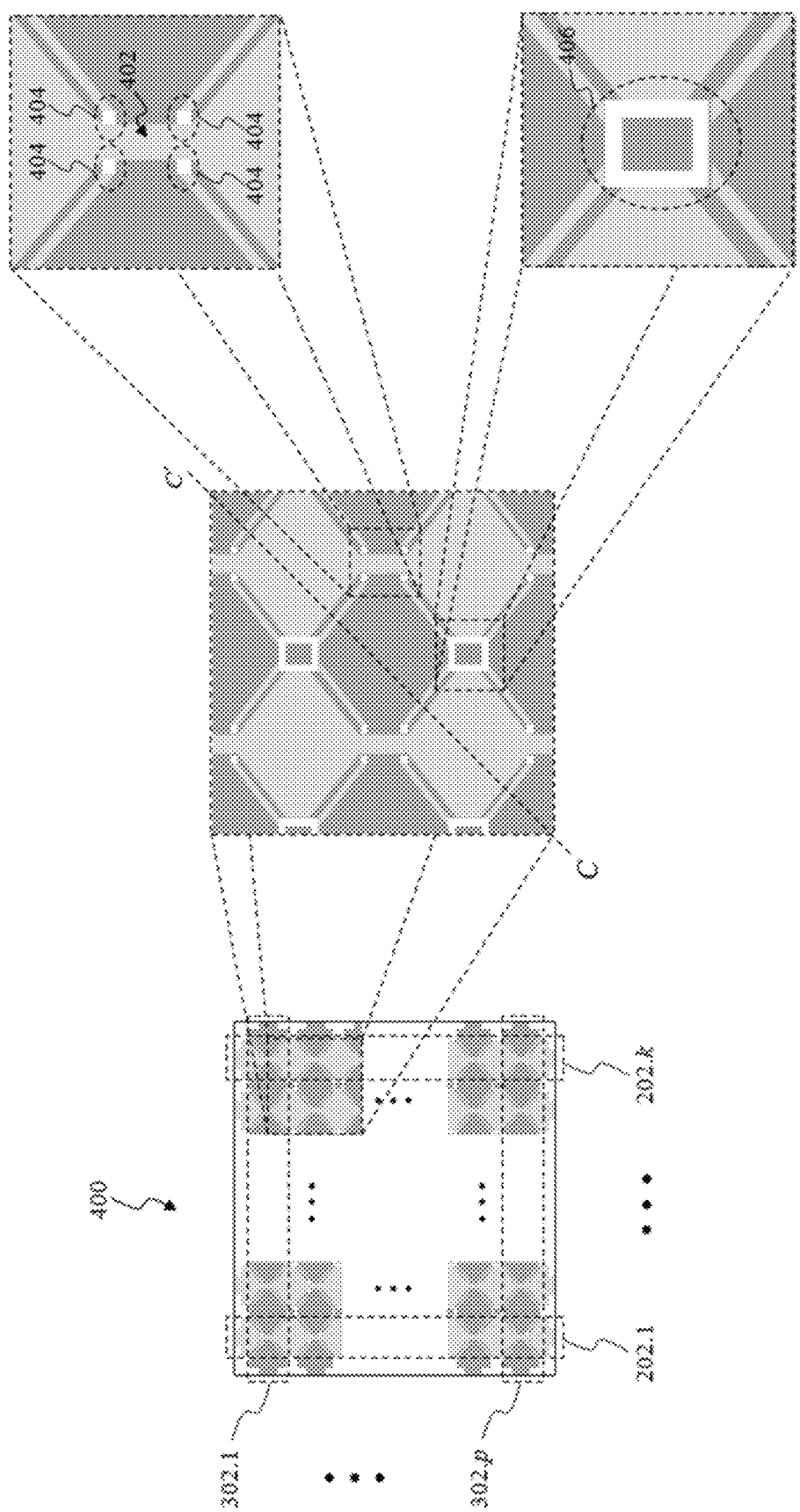
FIG. 4A illustrates an exemplary touchscreen according to an exemplary embodiment of the present disclosure.

FIG. 4A illustrates a first exemplary touchscreen 400 according to an exemplary embodiment of the present disclosure. For explanation purposes, FIG. 4A may be described with elements from previous figures. For example, touchscreen 400 may be the same as touchscreen 110. As illustrated in FIG. 4A, the first electrode pattern 200, illustrated in "light gray," and the second electrode pattern 300, illustrated in "dark gray," are overlaid on top of each other to form the touchscreen 400. In an embodiment, transparent substrates 204 and 304 are attached to each other (with the electrode patterns 200 and 300 facing each other) with an optically clear adhesive (OCA) to form the touchscreen 400. As illustrated in FIG. 4A, the vertical electrodes 202.1 through 202.M are placed side-by-side in a horizontal direction where each successive vertical electrode 202.1 to 202.M has an increasing x coordinate in a Cartesian coordinate system to provide an example. Similarly, the horizontal electrodes 302.1 through 302.N are placed one-above-the-other in a vertical direction where each successive horizontal electrode 302.1 to 302.$q$ has an increasing y coordinate in a Cartesian coordinate system to provide an example, to form the touchscreen 400. In an exemplary embodiment, the touchscreen 400 represents a PCAP touchscreen.

FIG. 4A additionally illustrates a portion of the touchscreen 400 in further detail. As discussed above, the touchscreen 400 is formed by overlaying electrode patterns 200 and 300 on top of each other. Ideally, when electrode patterns 200 and 300 are overlaid on top of each other, a single layer of transparent conductive material can be perceived by the human eye when viewing the touchscreen 400.

However, in some situations, one or more optical discontinuities may be present in the touchscreen 400.

As illustrated in FIG. 4A, one or more first regions 402 represent one or more first optical discontinuities having two or more layers of transparent conductive material formed by the overlaying of electrode patterns 200 and 300. For example, the one or more first regions 402 result from connections among columns of the electrode pads 206.1.1 through 206.*i*.M (of electrode pattern 200) overlaying corresponding connections among rows of the electrode pads 306.1.1 through 306.N.q (of electrode pattern 300).

As further illustrated in FIG. 4A, one or more second regions 404 and 406, illustrated in "white" in FIG. 4A, represent one or more second optical discontinuities having no layers of transparent conductive material formed by the overlaying of electrode patterns 200 and 300. The one or more second regions 404 represent regions having no layers of transparent conductive material at the ends of the floating transparent conductive islands 212.1 through 212.*a* (of electrode pattern 200) and/or the floating transparent conductive islands 312.1 through 312.*a* (of electrode pattern 300). Similarly, the one or more second regions 406 represent regions having no layers of transparent conductive material between the electrode pads 206.1.1 through 206.*i*.M and the electrode pads 306.1.1 through 306.N.q and associated floating transparent conductive islands.

Figure 7A:
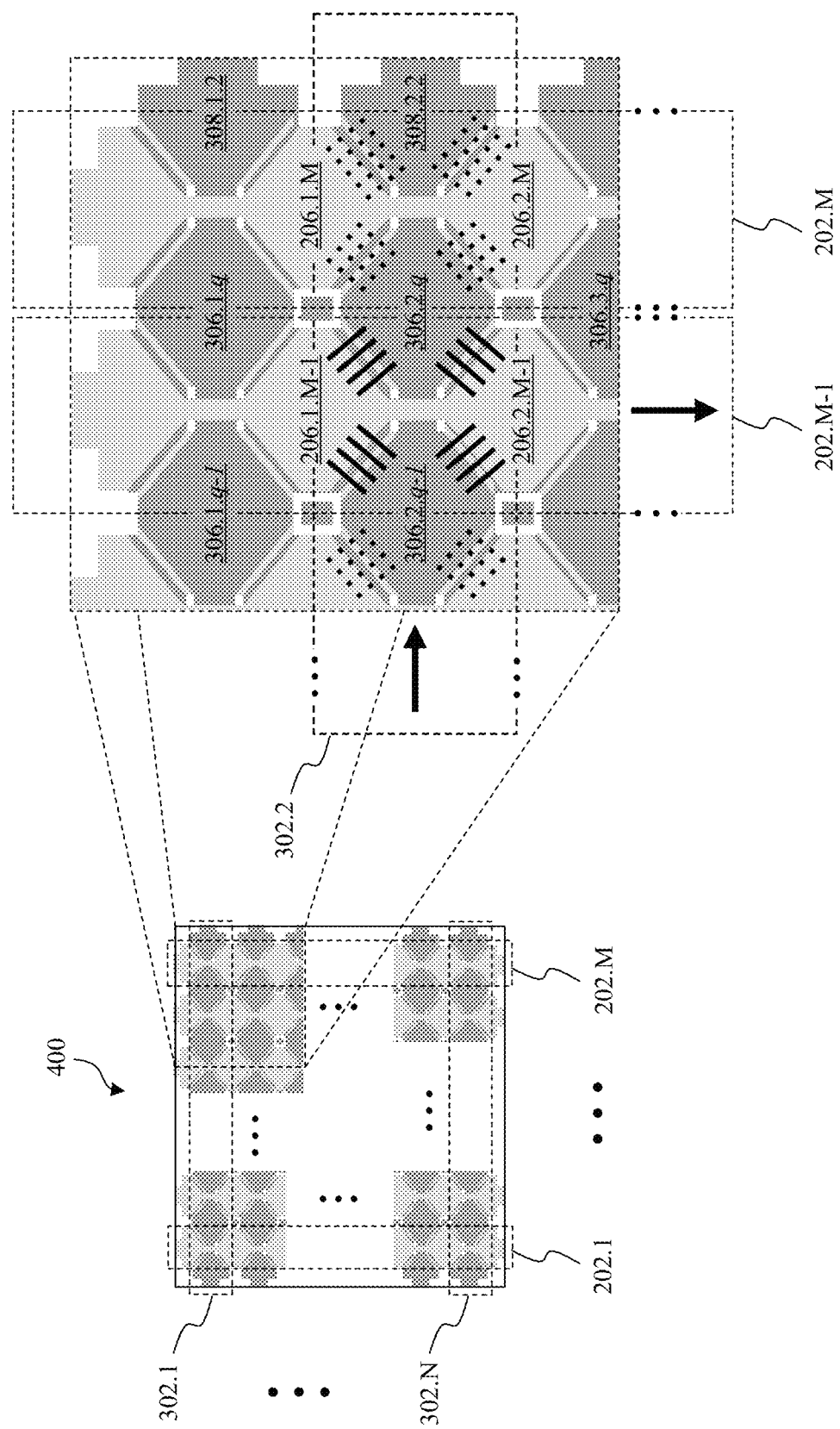
FIGS. 7A and 7B illustrate operation of the first exemplary touchscreen according to an exemplary embodiment of the present disclosure.
Figure 7B:
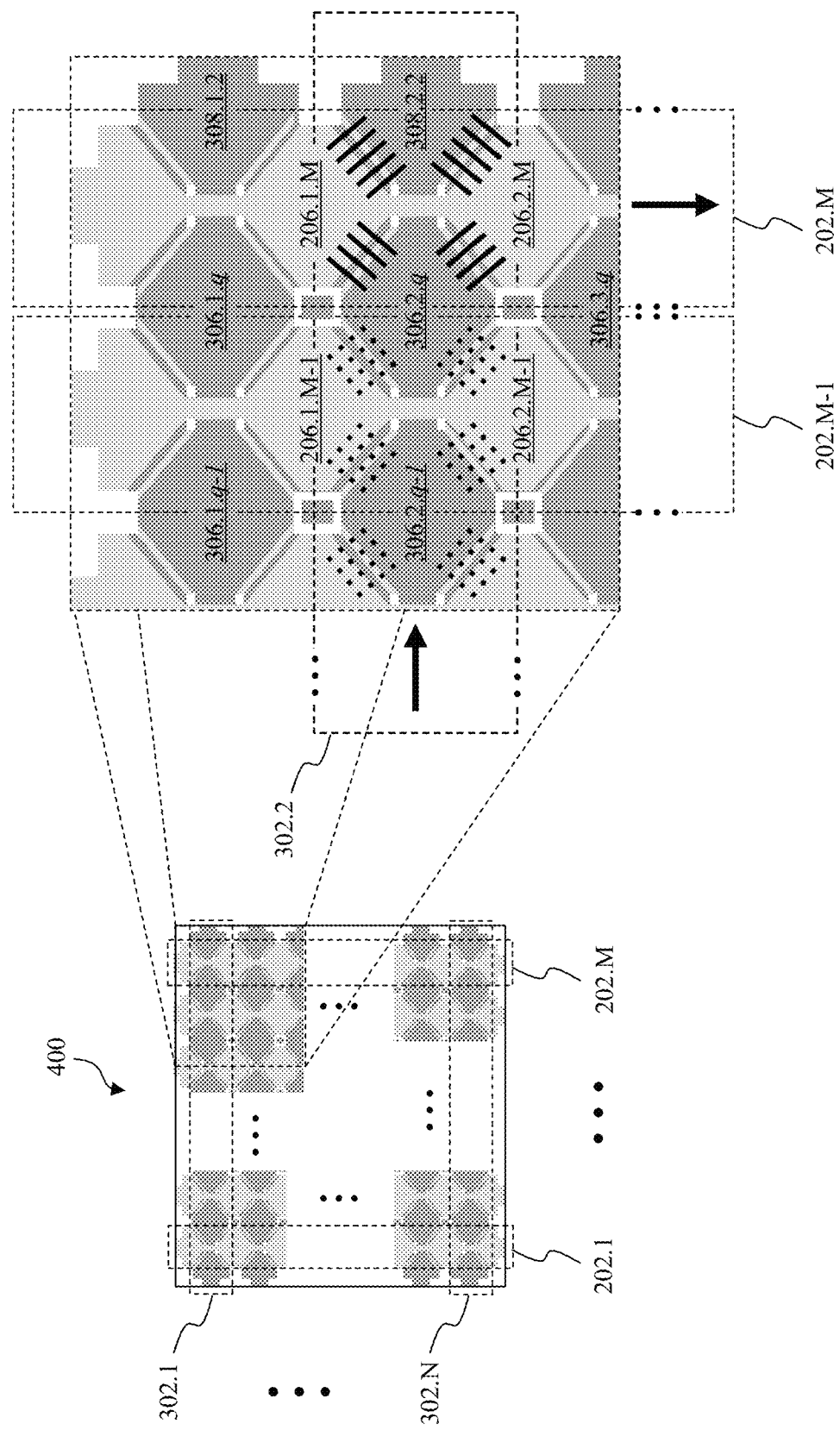

FIGS. 7A and 7B illustrate operation of the first exemplary touchscreen according to an exemplary embodiment of the present disclosure. As discussed above in FIG. 4A, the first electrode pattern 200, illustrated in "light gray," and the second electrode pattern 300, illustrated in "dark gray," are attached to form the touchscreen 400. Although only the operation of the touchscreen 400 is to be described in FIGS. 7A and 7B, those skilled in the relevant art(s) will recognize that this exemplary operation of the touchscreen 400 is likewise applicable to the touchscreen 110 without departing from the spirit and scope of the present disclosure.

The touchscreen 400 can operate in a row scanning mode of operation or in a column scanning mode of operation. In the row scanning mode of operation, one or more horizontal electrodes from among the horizontal electrodes 302.1 through 302.N are sequentially excited by a drive signal. The drive signal capacitively couples to one or more vertical electrodes from among the vertical electrodes 202.1 through 202.M. Transferred electrical charges or currents due to mutual capacitance(s) between the driven horizontal electrode and the one or more vertical electrodes are measured to detect a presence and/or a location of a touch from an operator, such as a finger of the operator, a hand of the operator, and/or other objects available to the operator, such as a stylus to provide an example. Similarly, in the column scanning mode of operation, one or more vertical electrodes from among the vertical electrodes 202.1 through 202.M are sequentially excited by a drive signal. The drive signal capacitively couples to one or more horizontal electrodes from among the horizontal electrodes 302.1 through 302.N. Transferred electrical charges or currents due to mutual capacitance(s) between the driven vertical electrode and the one or more horizontal electrodes are measured to detect a presence and/or a location of a touch from an operator. The description to follow further describes the operation of the touchscreen 400 in the row scanning mode of operation. Those skilled in the relevant art(s) will recognize that the column scanning mode of operation operates in a similar manner without departing from the spirit and scope of the present disclosure.

During the row scanning mode of operation and as further illustrated in FIGS. 7A and 7B, a horizontal electrode from among the horizontal electrodes 302.1 through 302.N is driven by an excitation signal which capacitively couples to all vertical electrodes 202.1 through 202.M. Specifically, FIG. 7A illustrates capacitive coupling of the drive signal from horizontal electrode 302.2 and vertical electrode 202.M−1 while FIG. 7B illustrates capacitive coupling of the drive signal from horizontal electrode 302.2 and vertical electrode 202.M. For explanation purposes, FIGS. 7A and 7B may be described with elements from previous figures.

Generally, a mutual capacitance "$C_M$" is associated with each of the horizontal electrodes 302.1 through 302.N and a corresponding one of the vertical electrodes 202.1 through 202.M. For example, if "i" represents an index for a vertical electrode 202.*i* from among the vertical electrodes 202.1 through 202.M, and if "j" represents an index of a horizontal electrode 302.*j* from among the horizontal electrodes 302.1 through 302.N, then M·N mutual capacitances are present between the vertical electrodes 202.1 through 202.M and the horizontal electrodes 302.1 through 302.N, which can be denoted as the set of mutual capacitances $C_M(i,j)$ for i=1 to M and j=1 to N.

FIGS. 2-4, 7A and 7B illustrate only one specific, example construction and geometry of electrodes of a PCAP touchscreen. The floating islands are purely optional. The electrode material may be ITO, a metal mesh, silver nanowires, an intrinsically conductive polymer, or any other conductive material. The electrode geometry may include diamond shaped pads (as in FIGS. 2-4, 7A, and 7B) or may simply divide the touch area into rectangular strips. The ideas presented below apply to any PCAP touchscreen with X and Y electrodes, that is to any touchscreen construction with a set of vertically oriented electrodes and with a set of horizontally oriented electrodes and associated self and mutual capacitances.

Figure 5:
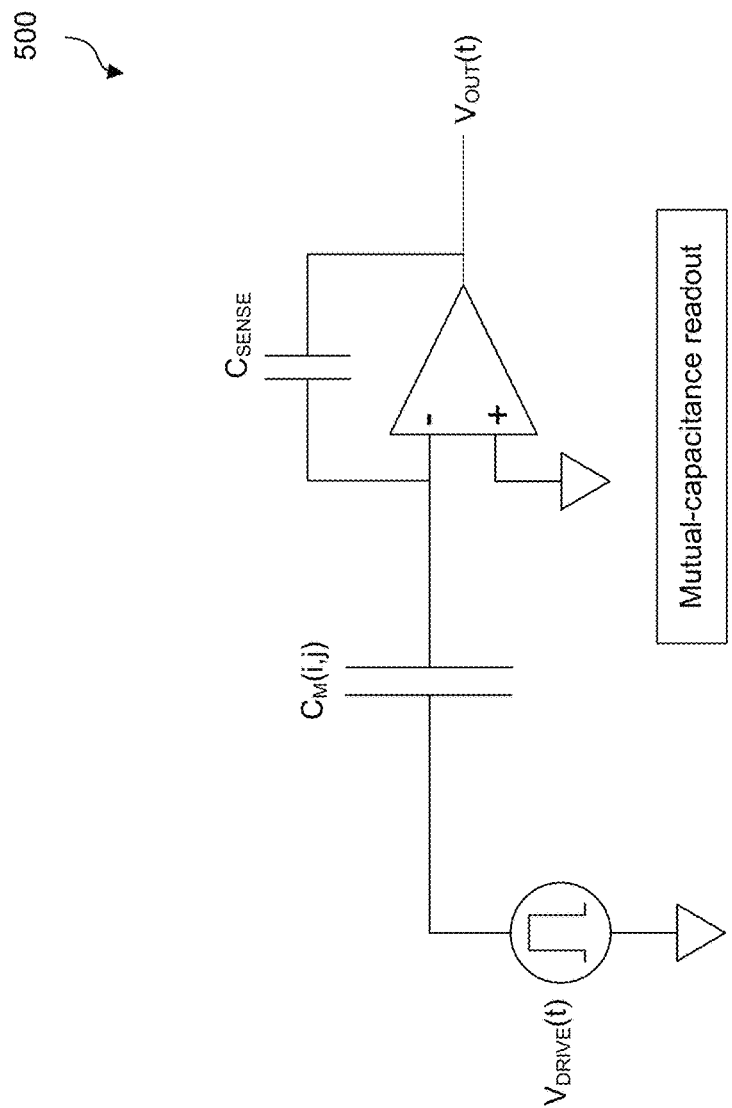
FIG. 5 illustrates a conceptual circuit for mutual-capacitance readout mode, according to example embodiments of the disclosure.

FIG. 5 illustrates a conceptual circuit 500 for mutual-capacitance readout mode, according to example embodiments of the disclosure. A signal $V_{DRIVE}(t)$ excites horizontal electrode j which couples through mutual capacitance $C_M(i,j)$ to vertical sense electrode which in turn is connected to a current sensing circuit. The signal output voltage $V_{OUT}(t)$ is proportional to the charge on the integrating capacitor $C_{SENSE}$. Note that the excitation signal is connected to one electrode (electrode j) and the sensing circuit is connected to another electrode (electrode i) and the measured signal is proportional to the mutual capacitance $C_M(i,j)$. A touch reduces the value of $C_M(i,j)$ by an amount $\Delta C_M(i,j)$. In other words, $\Delta C_M(i,j)$ represents touch induced changes in the measured mutual capacitance between vertical electrode "i" and horizontal electrode "j" relative to the baseline values $C_M(i,j)$.

Figure 6A:
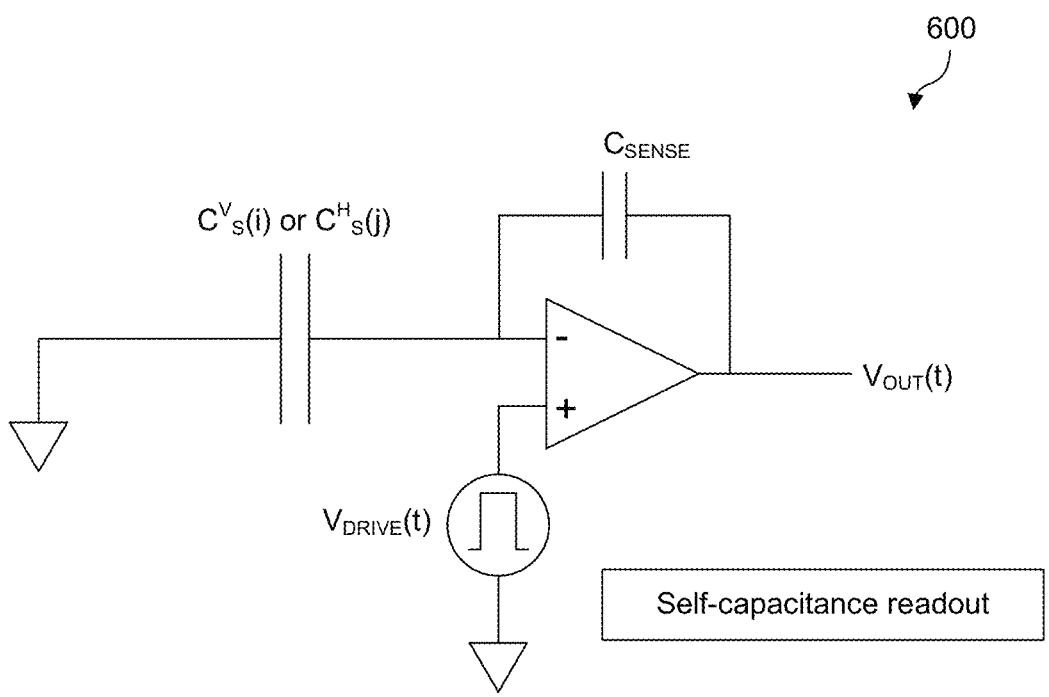
FIGS. 6A and 6B illustrate a conceptual circuit for self-capacitance readout mode, and an application adjustment diagram based on firmware-level data respectively, according to example embodiments of the disclosure.

The nature of mutual capacitance measurements has been described above. Self capacitances $C^V_S(i)$ are associated with vertical electrodes of index i where i=1, 2, 3, . . . M and self capacitances $C^H_S(j)$ are associated with horizontal electrodes of index j where j=1, 2, 3, . . . N. FIG. 6A illustrates a conceptual circuit 600 for self-capacitance readout mode, according to example embodiments of the disclosure. For explanation purposes, FIG. 6A may be described with elements from previous figures. A signal $V_{DRIVE}(t)$ at the positive high-gain differential amplifier input, is via feedback reproduced at the negative differential amplifier input, which in turn drives one electrode (vertical electrode i or horizontal electrode j). The ground to the left of the electrode self-capacitance $C^V_S(i)$ or $C^H_S(j)$ includes stray capacitances from the electrode to ground, as well as the grounding effect of any finger touch. A touch increases the value of $C^V_S(i)$ or $C^H_S(j)$. The charge on integrating capacitor $C_{SENSE}$ is the same as the charge on $C^V_S(i)$ or $C^H_S(j)$, and hence the signal output voltage $V_{OUT}(t)$ is proportional to the charge in $C^V_S(i)$ or $C^H_S(j)$. Note that in self-mode the excitation signal is delivered to the same electrode (i or j) that is sensed.

Figure 6B:
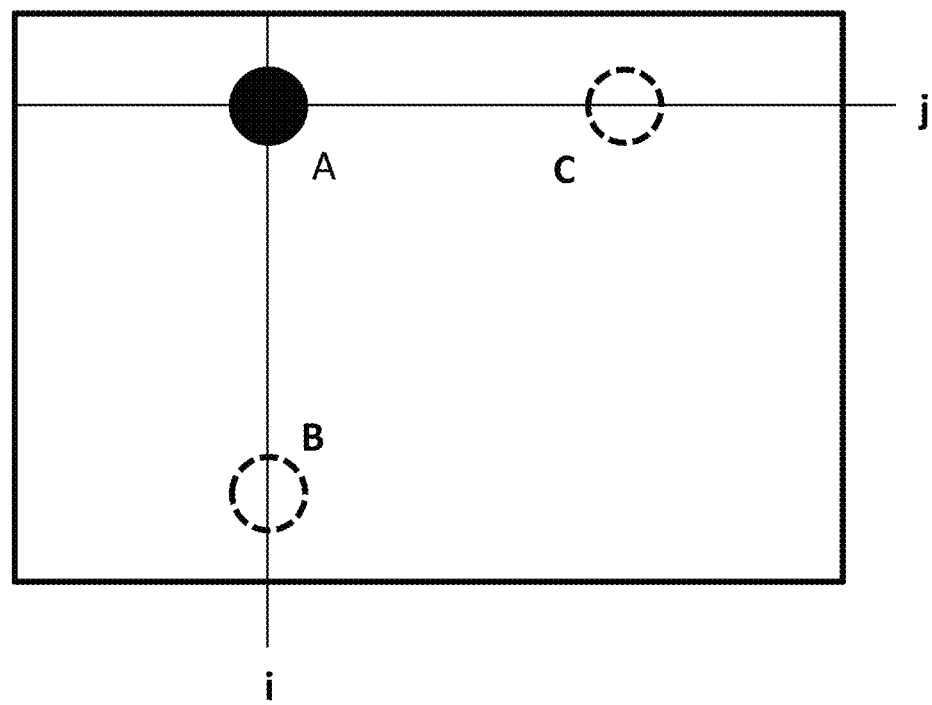

In the determination of the location of a touch using self-capacitance measurements, the X coordinate of the touch is determined from self-capacitances $C^V_S(i)$ of vertical electrodes and the Y coordinate is determined from the self-capacitances $C^H_S(j)$ of horizontal electrodes. Hence self-capacitances $C^V_S(i)$ and $C^H_S(j)$ of both vertical and horizontal electrodes are needed to determine the two-dimensional (x,y) coordinates of a touch. FIG. 6B illustrates an example 650 of self-capacitance touch measurements, according to example embodiments of the disclosure. To determine the location of touch A at the intersection of vertical electrode of index i and the horizontal electrode of index j, data from both vertical and horizontal electrodes is required. If data is available only from vertical electrodes, then one cannot determine if the touch is at point A, or at point B, or at some other point along vertical electrode i. Likewise, if only horizontal electrode data is available, then one cannot determine if the touch is at point A, or at point C, or at some other point along horizontal electrode j.

Figure 8:
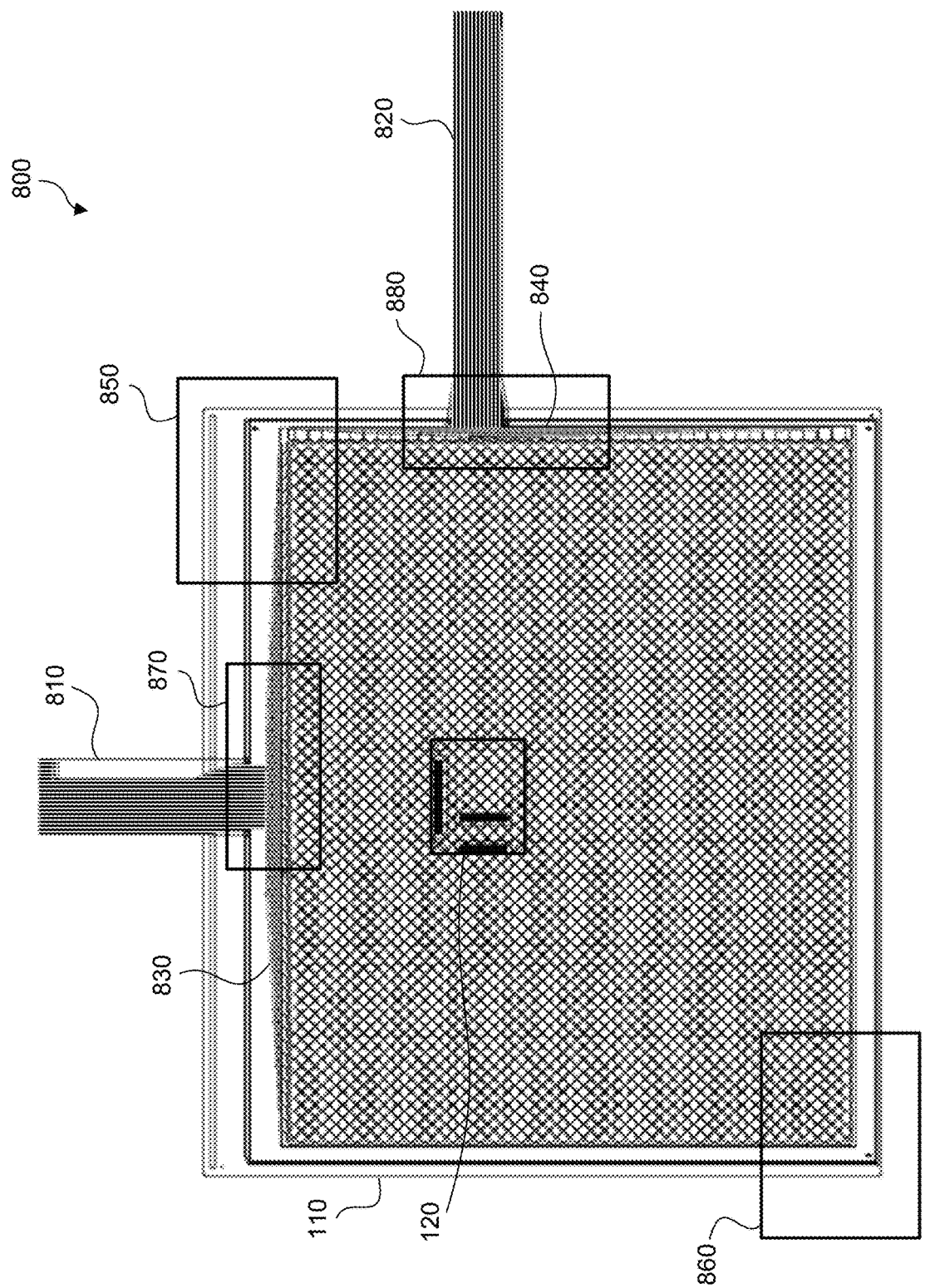
FIG. 8 illustrates an exemplary touchscreen system according to an exemplary embodiment of the present disclosure.

FIG. 8 illustrates an exemplary touchscreen system 800 according to an exemplary embodiment of the present disclosure. For explanation purposes, FIG. 8 may be described with elements from previous figures. Touchscreen system 800 includes touchscreen 110, and touchscreen controller 120 that may be located behind touchscreen 110. Flex cables 810 and 820 may represented by interface 160 of FIG. 1. Flex cable 810 may be communicatively coupled (not shown) to touchscreen controller 120 and routing traces 830. Routing traces 830 may be communicatively coupled to vertical electrodes 202.1 through 202.M of FIG. 2A and flex cable 810.

Flex cable 820 may be communicatively coupled (not shown) to touchscreen controller 120 and routing traces 840; routing traces 840 may be communicatively coupled to horizontal electrodes 302.1 through 302.N of FIG. 3A. Routing traces 830 and 840 may include silver, ITO, and/or metal mesh. Remaining portions of touchscreen system 800, namely portions 850, 860, 870, and 880 are described in subsequent figures.

A PCAP touchscreen system may be used in environments where they may be exposed to the elements such as water contaminants, and that exposure may affect the performance of the PCAP touchscreen system. As an example, exposure to heavy rain may result in long vertical water drops or rivulets on the PCAP touchscreen that may be sensed as false touches. To improve performance, some embodiments include hardware design refinements such as an increased separation between ITO/silver connection of an electrode terminus of an electrode and routing traces. FIGS. 9A and 9B illustrate portions of an exemplary touchscreens 900 and 950 according to an exemplary embodiment of the present disclosure. For explanation purposes, FIGS. 9A and 9B may be described with elements from previous figures. Touchscreen 900 includes portion 850 of FIG. 8 where distance 910 from a first vertical touchscreen electrode of a plurality of vertical touchscreen electrodes to routing traces 830 is greater than 3.0 mm. Values of 910 vary based on the distance from a particular vertical electrode to routing trace 830. For example, distance 910a may be 3.1 mm while the values of 910b-910d may be 3.2 mm, 3.3 mm, and 3.4 mm. In another example, distance 920 from a first horizontal touchscreen electrode of a plurality of horizontal touchscreen electrodes to routing traces 840 is greater than 3.0 mm. Likewise, distance 920a may be lower than distances 920b-920d. For example, the values of distance 920 may be as follows: 920a<920b<920c<920d. The distance 910 may be the same as or different from distance 920. In some embodiments, a distance from a first touchscreen electrode of the plurality of touchscreen electrodes to routing traces is greater than 3.0 mm.

Touchscreen 950 includes portion 860 of FIG. 8. Touchscreen 110 includes sensor guard lines 970 that are grouped around the sensor electrodes, and electrostatic discharge (ESD) lines 980 that form a ring around sensor guard lines 970. Sensor guard lines 970 shield the sensor electrodes and their routing traces away from the ESD lines 980, and ESD lines 980 protect touchscreen controller 120 from electrostatic shock. To improve performance in the presence of water contaminants, some embodiments maintain a distance 960 at the bottom horizontal edge of touchscreen 110 between sensor guard lines 970 and ESD lines 980 of greater than one sensor electrode pitch size and at least 5.0 mm. Example sensor electrode pitch sizes may include but are not limited to 7.0 mm and/or 7.5 mm. The distance 960 may be greater than a vertical water rivulet length and therefore reduce capacitive coupling via the vertical water rivulet and/or water droplet placed between sensor guard lines 970 and ESD lines 980. The separations may be, for example, a longer right-elbow design to reduce capacitive coupling. Some embodiments include a distance from a sensor guard line to an ESD line of the touchscreen where the distance is greater than one sensor electrode pitch size. In some embodiments, the distance from the sensor guard line to the ESD line of the touchscreen is at least 5.0 mm.

FIGS. 10A, 10B, and 10C illustrate layers of an exemplary touchscreen 1000, according to example embodiments of the disclosure. For explanation purposes, FIGS. 10A, 10B, and 10C may be described with elements from previous figures. Touchscreen 1000 of FIG. 10A may include an upper glass or upper film layer 204a similar to 204 of FIGS. 2A and 2B, a lower glass or lower film layer 304a similar to 304 of FIGS. 3A and 3B, and an adhesive layer 1010. Adhesive layer 1010 may be a solid optically clear adhesive (OCA) that can be an acrylic-based adhesive, a silicone-based adhesive, polyvinyl butyral (PVB), ethylene-vinyl acetate (EVA), or any other suitable OCA that will be recognized by those skilled in the relevant art(s). Circuitry layers 1020 and 1030 may include electrodes, routing traces, and trace shields of materials such as ITO, silver, and/or metal mesh. Layers 1020 and 1030 may be coupled to flex cables 810 and 820, respectively. To provide context for FIGS. 10B and 10C, touchscreen 1000 of FIG. 10A may be viewed as adhesive layer 1010 being sandwiched between touchscreen 1040 of FIG. 10B on top, and touchscreen 1070 of FIG. 10C on the bottom.

Touchscreen 1040 of FIG. 10B illustrates a view of circuitry layer 1020 on top of upper glass/film layer 204a. In other words, touchscreen 1040 depicts a view of upper glass/film layer 204a and circuitry layer 1020 that are peeled away from adhesive layer 1010 of FIG. 10A. Upper glass/film layer 204b illustrates the underside of upper glass/film layer 204a. Circuitry layer 1020 includes vertical sensor electrodes 1025 (e.g., vertical electrodes 202.1-202.M of FIG. 2A) and routing traces 830 of FIG. 8 coupled to flex cable 810. In some embodiments, circuitry layer 1020 also includes trace shield 1015b.

Touchscreen 1070 of FIG. 10C illustrates a view of circuitry layer 1030 on top of lower glass/film layer 304a. In other words, touchscreen 1070 depicts a view of circuitry layer 1030 and lower glass/film layer 304*a* when upper glass/film layer 204*a*, circuitry layer 1020, and adhesive layer 1010 have been peeled away from circuitry layer 1030 of FIG. 10A. Lower glass/film layer 304*b* illustrates the topside of lower glass/film layer 304*a*. Circuitry layer 1030 includes horizontal sensor electrodes 1035 (e.g., horizontal sensor electrodes 302.1-302.N of FIG. 3A) and routing traces 840 coupled to flex cable 820. In some embodiments, circuitry layer 1030 includes trace shield 1013*b*.

In some embodiments, trace shields 1013*b* and 1015*b* include a non-solid pattern of ITO, silver, and/or metal mesh material that cover or overlay respective portions of routing traces 830 and 840. The non-solid pattern may be any net or hashed pattern. In some embodiments, the non-solid pattern may provide 50% coverage of those areas. Current implementations do not include the non-solid pattern trace shields 1013*b* and/or 1015*b*. Instead, those areas may be covered with solid ITO, silver, or metal mesh materials, or those areas may be void of ITO, silver, or metal mesh materials. When solid ITO, silver, or metal mesh materials are implemented in the respective areas that overlay routing traces 830 and 840, the solid materials increase the baseline self-capacitance and negatively affects self-capacitance readout mode measurements sensitivity that is especially important for determining single touches on a PCAP touchscreen under conditions of water contaminant exposure. Having trace shields 1013*b* and 1015*b* with non-solid patterns reduce the baseline self-capacitance and improves the self-capacitance readout mode measurements sensitivity, thus improving single touch determination on a touchscreen with water contaminant exposure. When those areas (that overlay routing traces 830 and 840) are void of ITO, silver, or metal mesh materials, any finger touches in the areas could cause "false" touch signals in self-capacitance readout mode measurements for sensor active area covered by vertical sensor electrodes 1025 and horizontal sensor electrodes 1035, thus inducing false touch detection in the sensor active area. Having trace shields 1013*b* and 1015*b* with non-solid patterns prevents finger touches in the routing trace areas from causing false touch detection in the sensor active area in the self-capacitance readout mode measurements, as the trace shields 1013*b* and 1015*b* shield the routing traces for sensor electrodes away from the finger touch disturbance.

While FIGS. 10A, 10B, and 10C are directed to a single-sided ITO (SITO) implementation, equivalent trace shields 1013*b* and 1015*b* may also be implemented in a double-sided ITO (DITO) implementation. In some embodiments, a PCAP touchscreen includes an upper film/glass layer, a lower film/glass layer, and a middle adhesive layer, wherein the upper film/glass layer comprises a first non-solid trace shield that overlays a first routing trace on the lower film/glass layer and the lower film/glass layer comprises a second non-solid trace shield that overlays a second routing trace on the upper film/glass layer. The first non-solid trace shield on the upper film/glass layer comprises a pattern that overlays 50% of the first routing trace on the lower film/glass layer, and the second non-solid trace shield on the lower film/glass layer comprises a pattern that overlays 50% of the second routing trace on the upper film/glass layer.

FIGS. 11A and 11B illustrate portions of an exemplary trace shield 1013*b* in portions 1100 and 1150 respectively, according to example embodiments of the disclosure. For explanation purposes, FIGS. 11A and 11B may be described with elements from previous figures. Portion 1100 focuses on portion 870 of FIG. 8, and illustrates trace shield 1013*b* that covers routing traces 830, without showing routing traces 830. Portion 1150 also focuses on portion 870 of FIG. 8, and illustrates trace shield 1013*b* that covers routing traces 830. Flex cable 810 is shown in both FIGS. 11A and 11B for clarity.

FIGS. 12A and 12B illustrate portions of an exemplary trace shield 1015*b* in portions 1200, and 1250 respectively, according to example embodiments of the disclosure. For explanation purposes, FIGS. 12A and 12B may be described with elements from previous figures such as portion 880 of FIG. 8. Portion 1200 illustrates trace shield 1015*b* that covers routing traces 840 while routing traces 840 are not shown. Portion 1250 illustrates portion 880 with trace shield 1015*b* covering routing traces 840. Flex cable 820 and touchscreen 110 are shown for clarity.

Some embodiments include flex cable 810 coupled to vertical receiver lines affixed on a top horizontal edge of a PCAP touchscreen 110. Affixing flex cable 810 to the top horizontal edge reduces the exposure of routing traces 830 to water contaminants and the resultant coupling of routing traces 830 to ESD lines 980 of FIG. 9B compared to affixing a flex cable to the bottom horizontal edge, for example.

Touchscreen controller 120 (e.g., one or more processors), firmware 125, and/or computer program products such as software application 135 of computing device 130 may include methods for rejecting false touches due to long vertical water drops/rivulets. FIG. 15 illustrates a diagram 1500 of fluid measurements on a PCAP touchscreen based on a mixed mode (mutual capacitance and self-capacitance) measurement frame, according to example embodiments of the disclosure. For explanation purposes, FIG. 15 may be described with elements from previous figures. As discussed in the Immunity Application, compared to conventional approaches, the mixed mode measurement frame operation generates data richer in information about the nature of any water contamination that may be present on touchscreen 110. Diagram 1500 illustrates water on touchscreen 110 of FIG. 1 as an image and two plots of a raw-touch data frame capture including both self-capacitance measurements (two plots) and mutual-capacitance measurements (the heatmap image). Under these conditions, mutual-capacitance measurement data 1530 illustrates touch detections caused by water as well as finger touch on touchscreen 110, namely MutualPeak(A) 1540 and MutualPeak(B) 1550. Self-capacitance measurements 1520 are from vertical electrodes and self-capacitance measurements 1510 are from horizontal electrodes. Note that self-capacitance measurement 1520 indicates two X-peak amplitude values, in a single data frame capture: SelfPeak(X1)=60 and SelfPeak(X2)=330. In an interpretation, self-capacitance measurement 1510 indicates two Y-peak amplitude values, in a single data frame capture: SelfPeak(Y1)=190 and SelfPeak(Y2)=140. (Please note that FIG. 15 is not necessarily drawn to scale.)

Some embodiments include a method, system, and computer program product for firmware 125, touchscreen controller 120 (e.g., one or more processors of touchscreen controller 120), and/or application 135 of computing device 130 to reject false touches due to long vertical water drops/rivulets as demonstrated in FIG. 15. FIG. 13 illustrates a method 1300 for rejecting false touches, according to example embodiments of the disclosure. For explanation purposes, FIG. 13 may be described with elements from previously described figures.

At 1310, method 1300 processes self-capacitance measurements from vertical and horizontal electrodes for each data frame capture. For example, one or more processors of touchscreen controller 120 may obtain self-capacitance measurements collected from touchscreen 110. As shown in FIG. 15, X-peak amplitude values in a single data frame capture include SelfPeak(X1)=60 and SelfPeak(X2)=330 and Y-peak amplitude values in a single data frame capture include SelfPeak(Y1)=190 and SelfPeak(Y2)=140.

At 1320, method 1300 determines one or more {X, Y} candidate touches. An {X, Y} candidate touch includes an X-peak amplitude value obtained from vertical electrode measurements (e.g., 202.1-202.M) and a Y-peak amplitude value obtained from horizontal electrode measurements (e.g., 302.1-302.N.) Based on FIG. 15, four candidate touches are examined: (X1, Y1), (X1, Y2), (X2, Y1), and (X2, Y2).

At 1330, for each {X, Y} candidate touch of one or more {X, Y} candidate touches collected in a data frame capture, method 1300 computes an $X_{PEAK}$ over $Y_{PEAK}$ ratio, $R_{XY}$, where $R_{XY}=(X_{PEAK}$ amplitude$)/(Y_{PEAK}$ amplitude$)$. For example, the values of $R_{XY}=(X1/Y1)=60/190=0.32$.

At 1340, method 1300 determines that $R_{XY}<R_{MIN}$ or $R_{XY}>R_{MAX}$. When $R_{XY}<R_{MIN}$ or $R_{XY}>R_{MAX}$, method 1300 proceeds to 1350. In other words, when method 1300 determines that $R_{XY}$ is not in the range of $R_{MIN}<=R_{XY}<=R_{MAX}$, method 1300 proceeds to 1350. Otherwise, method 1300 proceeds to 1360. Values of $R_{MIN}$ and $R_{MAX}$ are based on empirical data depending on the design or type of PCAP touchscreen. Some embodiments include values of $R_{MIN}$ and $R_{MAX}$ as follows: $R_{MIN}=0.8$ and $R_{MAX}=2.8$. Based on FIG. 15 and assuming the values above for $R_{MIN}$ and $R_{MAX}$, $R_{XY}$ is less than 0.8 so method 1300 would proceed to 1350.

At 1350, method 1300 rejects the {X, Y} candidate touch. For example, (X1, Y1) would be rejected as the value of $R_{XY}=0.32$ which is less than 0.8.

At 1360, method 1300 keeps and includes {X, Y} candidate touch in the subsequent mixed mode analysis.

At 1370, method 1300 determines whether the {X, Y} candidate touch was the last of the one or more{X, Y} candidate touches checked. When the {X, Y} candidate touch is the last {X, Y} candidate touch, method 1300 proceeds to 1380. Otherwise, method 1300 proceeds to 1390.

At 1390, method 1300 continues to the next {X, Y} candidate touch of the one or more {X, Y} candidate touches and method 1300 returns to 1330 where $R_{XY}$ values are determined.

At 1380, method 1300 ends.

In the above example, (X1, Y2) on a subsequent iteration would be rejected as the value of $R_{XY}=60/140=0.43$ For example, in a subsequent iteration, (X2, Y1) and (X2, Y2) would be retained as potential real touch data as their respective $R_{XY}$ values are 1.74 (e.g., 330/190) and 2.35 (e.g., 330/140). Thus, method 1300 eliminated {X, Y} candidate touches (X1, Y1) and (X1, Y2).

In some embodiments, a method includes accessing mutual-capacitance and self-capacitance touch data obtained from a plurality of touchscreen electrodes of the touchscreen, and detecting false touches based on the self-capacitance touch data. Detecting the false touches includes accessing one or more \ candidate touches, and for a first candidate touch of the one or more candidate touches, computing a first $R_{XY}$ peak ratio, wherein the first $R_{XY}$ peak ratio comprises [(X peak amplitude)/(Y peak amplitude)] of the first candidate touch. The method also includes determining that the first $R_{XY}$ peak ratio is greater than or equal to $R_{MIN}$ and less than or equal to $R_{MAX}$, and determining that the first candidate touch is not a false touch, and analyzing the mutual-capacitance touch data and the first candidate touch to determine valid touches.

FIG. 14 illustrates method 1400 for rejecting false touches, according to example embodiments of the disclosure. For explanation purposes, FIG. 14 may be described with elements from previously described figures. Method 1400 performs an interior candidate touch check to determine how many {X, Y} candidate touches of a data capture frame are located on interior electrodes. Subsequently, method 1400 performs a perimeter candidate touch check to determine whether {X, Y} candidate touches located on edge electrodes may be false touches and may be discarded.

At 1405, method 1400 processes self-capacitance measurements from vertical and horizontal electrodes. For example, one or more processors of touchscreen controller 120 and/or firmware 125 may obtain self-capacitance measurements collected from touchscreen 110.

At 1410, method 1400 determines one or more {X, Y} candidate touches. An {X, Y} candidate touch includes an X-peak amplitude value obtained from vertical electrode measurements (e.g., 202.1-202.M) and a Y-peak amplitude value obtained from horizontal electrode measurements (e.g., 302.1-302.N.) Method 1400 also sets an interior candidate touch counter, $N_{INT}$, to zero. As shown in FIG. 15, X-peak amplitude values in a single data frame capture include SelfPeak(X1)=60 and SelfPeak(X2)=330 and Y-peak amplitude values in a single data frame capture include SelfPeak(Y1)=190 and SelfPeak(Y2)=140.

At 1415, for each {X, Y} candidate touch of one or more {X, Y} candidate touches collected in the data frame capture, method 1400 determines a location for the $X_{PEAK}$ amplitude value and a location for the $Y_{PEAK}$ amplitude value. Based on FIG. 15, four candidate touches are examined: (X1, Y1), (X1, Y2), (X2, Y1), and (X2, Y2).

At 1420, for each {X, Y} candidate touch, method 1400 determines whether an $X_{PEAK}$ location or $Y_{PEAK}$ location is located on any edge electrode. An edge electrode may be a vertical or a horizontal electrode on the perimeter of touchscreen 110, for example. The remaining electrodes are interior electrodes. When an X-peak location or Y-peak location is located on any edge electrode, method 1400 proceeds to 1430. Otherwise, method 1400 proceeds to 1425. Based on FIG. 15, for candidate touch (X2, Y2), SelfPeak(Y2) is located on an edge electrode and method 1400 would proceed to 1430. For candidate touch (X2, Y1), method 1400 would proceed to 1425.

At 1425, method 1400 determined that the {X, Y} candidate touch is located on interior electrodes, and method 1400 increments interior candidate touch counter, $N_{INT}$.

At 1430, method 1400 determines whether the {X, Y} candidate touch was the last of the one or more{X, Y} candidate touches checked. When the {X, Y} candidate touch is the last {X, Y} candidate touch, method 1400 proceeds to 1440. Otherwise, method 1400 proceeds to 1435.

At 1435, method 1400 continues to the next {X, Y} candidate touch of the one or more {X, Y} candidate touches, and method 1400 returns to 1415. For example, based on FIG. 15, remaining candidate touches would be checked.

At 1440, method 1400 exits the interior candidate touch check loop.

At 1445, method 1400 may for each {X, Y} candidate touch of one or more {X, Y} candidate touches collected in the data frame capture, determine a location for the X-peak amplitude value and a location for the Y-peak amplitude value.

At 1450, for each {X, Y} candidate touch, method 1400 determines whether an X-peak location or Y-peak location is located on any edge electrode, and whether interior candidate touch counter $N_{INT}$ is greater than zero (e.g., an {X, Y} candidate touch located on interior electrodes was previously detected.) When both conditions are satisfied, method 1400 proceeds to 1455. Otherwise, method 1400 proceeds to 1460.

At 1455, method 1400 rejects this {X, Y} candidate touch (e.g., since an interior {X, Y} candidate touch was previously determined, the current perimeter {X, Y} candidate touch may be a false touch and thus not utilized in subsequent mixed mode analysis.)

At 1460, method 1400 retains and includes the {X, Y} candidate touch in the subsequent mixed mode analysis.

At 1465, method 1400 determines whether the {X, Y} candidate touch was the last of the one or more {X, Y} candidate touches checked. When the {X, Y} candidate touch is the last {X, Y} candidate touch, method 1400 proceeds to 1470. Otherwise, method 1400 proceeds to 1475.

At 1475, method 1400 continues to the next {X, Y} candidate touch of the one or more {X, Y} candidate touches, and method 1400 returns to 1445.

At 1470, method 1400 exits the perimeter candidate touch check loop, and method 1400 ends.

Methods 1300 and 1400 may be utilized alone or in conjunction with each other. Based on FIG. 15, for example, method 1300 would have retained (X2, Y1) and (X2, Y2) based on their respective values of $R_{XY}$. Method 1400 would eliminate (X2, Y2) and retain (X2, Y1) as a valid {X, Y} candidate touch to be utilized in subsequent mixed-mode analysis which would result in MutualPeak(A) 1540 being identified as a valid touch location and MutualPeak(B) 1550 as a false touch.

Some embodiments include for each of the one or more candidate touches, determining an X-peak location and a Y-peak location, and determining that an X-peak location and a Y-peak location of the first candidate touch are both located on interior electrodes, wherein the first candidate touch is included in the analysis to determine valid touches. Some embodiments also include for a second candidate touch of the one or more candidate touches, computing a second $R_{XY}$ peak ratio, wherein the second $R_{XY}$ peak ratio comprises [(X peak amplitude)/(Y peak amplitude)] of the second candidate touch. Embodiments also include determining that the second $R_{XY}$ peak ratio computed is greater than or equal to $R_{MIN}$ and less than or equal to $R_{MAX}$, and determining that the second candidate touch is located on an edge electrode wherein the second candidate touch is not included in the analysis to determine valid touches.

Various embodiments can be implemented, for example, using one or more well-known computer systems, such as computer system 1600 shown in FIG. 16. Computer system 1600 can be any well-known computer capable of performing the functions described herein such as computing device 130 and touchscreen controller 120. Computer system 1600 may be internal or external to system 100 as discussed above.

Computer system 1600 includes one or more processors (also called central processing units, or CPUs), such as a processor 1604. Processor 1604 is connected to a communication infrastructure or bus 1606. One or more processors 1604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 1600 also includes user input/output device(s) 1602, such as monitors, keyboards, pointing devices, etc., that communicate with communication infrastructure 1606 through user input/output interface(s) 1602.

Computer system 1600 also includes a main or primary memory 1608, such as random access memory (RAM). Main memory 1608 may include one or more levels of cache. Main memory 1608 has stored therein control logic (i.e., computer software) and/or data. Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 reads from and/or writes to removable storage unit 1618 in a well-known manner.

According to an exemplary embodiment, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc. (individually and collectively referenced by reference number 1628). For example, communication interface 1624 may allow computer system 1600 to communicate with remote devices 1628 over communications path 1626, which may be wired and/or wireless, and which may include any combination of LANs, WANs, the Internet, etc. Control logic and/or data may be transmitted to and from computer system 1600 via communication path 1626.

In an embodiment, a tangible apparatus or article of manufacture comprising a tangible computer useable or readable medium having control logic (software) stored thereon is also referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 16. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A water immune projected capacitive (PCAP) touch system, comprising:
    a touchscreen; and
    a processor communicatively coupled to the touchscreen, wherein the processor is configured to:
        access mutual-capacitance and self-capacitance touch data obtained from a plurality of touchscreen electrodes of the touchscreen;
        detect false touches based on the self-capacitance touch data, the self-capacitance touch data comprising signal amplitude data in separate coordinate measurements, wherein the processor is configured to:
            identify peak coordinate data as individual coordinates for pairing as positions of candidate touches;
            compute a ratio value of peak amplitude data of a first candidate touch,
        wherein the ratio value is a ratio of an X-peak amplitude value and a Y-peak amplitude value; and
        determine that the first candidate touch is not a false touch when the ratio value is within a predetermined ratio range; and
    analyze the mutual-capacitance touch data and the first candidate touch to determine valid touches, wherein a distance from a sensor guard line to an electrostatic discharge (ESD) line of the touchscreen is greater than one sensor electrode pitch size.

2. The water immune PCAP touch system of claim 1, wherein the processor is further configured to:
    for each of the candidate touches, determine an X-peak location and a Y-peak location; and
    determine that the X-peak location and the Y-peak location of the first candidate touch are both located on interior electrodes of the touchscreen, wherein the first candidate touch is included in the analysis to determine the valid touches.

3. The water immune PCAP touch system of claim 2, wherein the processor is further configured to:
    for a second candidate touch, compute a second ratio value, wherein the second ratio value comprises peak amplitude values of the second candidate touch;
    determine that the second ratio value computed is within the predetermined ratio range; and
    determine that the second candidate touch is located on an edge vertical electrode and/or an edge horizontal electrode of the touchscreen, wherein the second candidate touch is not included in the analysis to determine the valid touches.

4. The water immune PCAP touch system of claim 1, wherein the touchscreen comprises an upper film/glass layer, a lower film/glass layer, and a middle adhesive layer, wherein the upper film/glass layer comprises a first non-solid trace shield that overlays a first routing trace bundle on the lower film/glass layer, and the lower film/glass layer comprises a second non-solid trace shield that overlays a second routing trace bundle on the upper film/glass layer.

5. The water immune PCAP touch system of claim 4, wherein the first non-solid trace shield on the upper film/glass layer comprises a pattern that overlays 50% of the first routing trace bundle on the lower film/glass layer; and the second non-solid trace shield on the lower film/glass layer comprises a pattern that overlays 50% of the second routing trace bundle on the upper film/glass layer.

6. The water immune PCAP touch system of claim 1, wherein a distance from a first touchscreen electrode terminus of the plurality of touchscreen electrodes to routing traces is greater than 3.0 mm.

7. The water immune PCAP touch system of claim 1, wherein the distance from the sensor guard line to the ESD line of the touchscreen is at least 5.0 mm.

8. The water immune PCAP touch system of claim 1, wherein the individual coordinates comprise: one or more X-peak amplitude values obtained from one or more vertical electrode measurements, and one or more Y-peak amplitude values obtained from one or more horizontal electrode measurements of a single data frame capture; and
    wherein to pair the individual coordinates as the positions of the candidate touches, the processor is configured to determine different combinations of the one or more X-peak amplitude values and the one or more Y-peak amplitude values.

9. A method for a water immune projected capacitive (PCAP) touch system, comprising:
    accessing mutual-capacitance and self-capacitance touch data obtained from a plurality of touchscreen electrodes of a touchscreen;

detecting false touches based on the self-capacitance touch data, the self-capacitance touch data comprising signal amplitude data in separate coordinate measurements, wherein the detection comprises:
identifying peak coordinate data as individual coordinates for pairing as positions of candidate touches;
compute a ratio value of peak amplitude data of a first candidate touch, wherein the ratio value is a ratio of an X-peak amplitude value and a Y-peak amplitude value; and
determining that the first candidate touch is not a false touch when the ratio value is within a predetermined ratio range; and
analyzing the mutual-capacitance touch data and the first candidate touch to determine valid touches, wherein a distance from a sensor guard line to an electrostatic discharge (ESD) line of the touchscreen is greater than one sensor electrode pitch size.

10. The method of claim 9, further comprising:
for each of the candidate touches, determining an X-peak location and a Y-peak location; and
determining that the X-peak location and the Y-peak location of the first candidate touch are both located on interior electrodes of the touchscreen, wherein the first candidate touch is included in the analysis to determine the valid touches.

11. The method of claim 10, further comprising:
for a second candidate touch, computing a second ratio value, wherein the second ratio value comprises peak amplitude values of the second candidate touch;
determining that the second ratio value computed is within the predetermined ratio range; and
determining that the second candidate touch is located on an edge vertical electrode and/or an edge horizontal electrode of the touchscreen, wherein the second candidate touch is not included in the analysis to determine the valid touches.

12. The method of claim 9, wherein the touchscreen comprises an upper film/glass layer, a lower film/glass layer, and a middle adhesive layer, wherein the upper film/glass layer comprises a first non-solid trace shield that overlays a first routing trace bundle on the lower film/glass layer, and the lower film/glass layer comprises a second non-solid trace shield that overlays a second routing trace bundle on the upper film/glass layer.

13. The method of claim 12, wherein the first non-solid trace shield on the upper film/glass layer comprises a pattern that overlays 50% of the first routing trace bundle on the lower film/glass layer; and the second non-solid trace shield on the lower film/glass layer comprises a pattern that overlays 50% of the second routing trace bundle on the upper film/glass layer.

14. The method of claim 9, wherein a distance from a first touchscreen electrode terminus of the plurality of touchscreen electrodes to routing traces is greater than 3.0 mm.

15. The method of claim 9, wherein the distance from the sensor guard line to the ESD line of the touchscreen is at least 5.0 mm.

16. The method of claim 9, further comprising:
wherein the individual coordinates comprise: one or more X-peak amplitude values obtained from one or more vertical electrode measurements, and one or more Y-peak amplitude values obtained from one or more horizontal electrode measurements of a single data frame capture; and
wherein to pair the individual coordinates as the positions of the candidate touches comprises, determining different combinations of the one or more X-peak amplitude values and the one or more Y-peak amplitude values.

17. A non-transitory computer readable medium having stored therein one or more instructions that, when executed by one or more processors, cause the one or more processors of a first touch controller application-specific integrated circuit (ASIC) to perform operations, the operations comprising:
accessing mutual-capacitance and self-capacitance touch data obtained from a plurality of touchscreen electrodes of a touchscreen;
detecting false touches based on the self-capacitance touch data, the self-capacitance touch data comprising signal amplitude data in separate coordinate measurements, wherein the operations comprise:
identifying peak coordinate data as individual coordinates for pairing as positions of candidate touches;
computing a ratio value of peak amplitude data of a first candidate touch, wherein the ratio value is a ratio of an X-peak amplitude value and a Y-peak amplitude value; and
determining that the first candidate touch is not a false touch when the ratio value is within a predetermined ratio range; and
analyzing the mutual-capacitance touch data and the first candidate touch to determine valid touches, wherein a distance from a sensor guard line to an electrostatic discharge (ESD) line of the touchscreen is greater than one sensor electrode pitch size.

18. The non-transitory computer readable medium of claim 17, the operations further comprising:
for each of the candidate touches, determining an X-peak location and a Y-peak location; and
determining that the X-peak location and the Y-peak location of the first candidate touch are both located on interior electrodes of the touchscreen, wherein the first candidate touch is included in the analysis to determine the valid touches.

19. The non-transitory computer readable medium of claim 18, the operations further comprising:
for a second candidate touch, computing a second ratio value, wherein the second ratio value comprises peak amplitude values of the second candidate touch;
determining that the second ratio value computed is within the predetermined ratio range; and
determining that the second candidate touch is located on an edge vertical electrode and/or an edge horizontal electrode of the touchscreen, wherein the second candidate touch is not included in the analysis to determine the valid touches.

20. The non-transitory computer readable medium of claim 17, wherein the touchscreen comprises an upper film/glass layer, a lower film/glass layer, and a middle adhesive layer, wherein the upper film/glass layer comprises a first non-solid trace shield that overlays a first routing trace bundle on the lower film/glass layer, and the lower film/glass layer comprises a second non-solid trace shield that overlays a second routing trace bundle on the upper film/glass layer.

\* \* \* \* \*

UNITED STATES PATENT AND TRADEMARK OFFICE
CERTIFICATE OF CORRECTION

PATENT NO.        : 10,983,636 B2
APPLICATION NO.   : 16/528079
DATED             : April 20, 2021
INVENTOR(S)       : Ali et al.

Page 1 of 1

It is certified that error appears in the above-identified patent and that said Letters Patent is hereby corrected as shown below:

In the Claims

In Column 21, Line 7, please replace "compute a ratio value" with -- computing a ratio value --.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*